(12) United States Patent
Rinks et al.

(10) Patent No.: US 7,409,967 B2
(45) Date of Patent: Aug. 12, 2008

(54) PATTERN FORMER FOR WRAPPED BAKERY PRODUCTS AND METHOD FOR LOADING AND UNLOADING BAKERY PRODUCTS

(75) Inventors: William A. Rinks, Lavon, TX (US); John M. Lucido, Garland, TX (US)

(73) Assignee: Stewart Systems, Inc., Plano, TX (US)

( * ) Notice: Subject to any disclaimer, the term of this patent is extended or adjusted under 35 U.S.C. 154(b) by 0 days.

(21) Appl. No.: 11/695,966

(22) Filed: Apr. 3, 2007

(65) Prior Publication Data
US 2007/0169440 A1 Jul. 26, 2007

Related U.S. Application Data

(60) Division of application No. 11/249,992, filed on Oct. 13, 2005, now Pat. No. 7,305,806, which is a continuation-in-part of application No. 11/070,649, filed on Mar. 2, 2005, now Pat. No. 7,076,934, which is a continuation of application No. 10/794,443, filed on Mar. 5, 2004, now Pat. No. 6,862,869, which is a continuation-in-part of application No. 10/093,242, filed on Mar. 8, 2002, now Pat. No. 6,766,631, which is a continuation of application No. 09/587,127, filed on Jun. 2, 2000, now Pat. No. 6,401,435.

(60) Provisional application No. 60/159,627, filed on Oct. 14, 1999.

(51) Int. Cl.
*F15B 13/04* (2006.01)

(52) U.S. Cl. .............................. 137/625.67; 137/625.25

(58) Field of Classification Search ............ 137/625.25, 137/625.67
See application file for complete search history.

(56) References Cited

U.S. PATENT DOCUMENTS

| | | | | |
|---|---|---|---|---|
| 1,855,913 A * | 4/1932 | Hueber et al. | ........... | 137/625.25 |
| 1,877,700 A * | 9/1932 | Silvene | ................... | 137/625.25 |
| 2,293,906 A * | 8/1942 | Kvavle et al. | .......... | 137/625.25 |
| 2,653,580 A * | 9/1953 | Moore, III | ............. | 137/625.67 |
| 2,998,828 A * | 9/1961 | Hare | ...................... | 137/625.25 |
| 3,556,152 A * | 1/1971 | Nystrand | ................ | 137/625.21 |
| 3,650,724 A * | 3/1972 | Lush | ........................... | 62/174 |
| 4,754,596 A * | 7/1988 | Yasumune et al. | ............. | 53/434 |
| 4,817,683 A * | 4/1989 | Laub et al. | ............. | 137/625.69 |
| 5,299,599 A * | 4/1994 | Farmer et al. | .......... | 137/625.22 |
| 6,832,629 B2 * | 12/2004 | Wu | ........................ | 137/625.21 |
| 2006/0108011 A1 * | 5/2006 | George et al. | .......... | 137/625.21 |

* cited by examiner

*Primary Examiner*—John Rivell
(74) *Attorney, Agent, or Firm*—Michael A. O'Neil

(57) ABSTRACT

A pattern former for assembling wrapped bakery products into predetermined patterns comprises a perforated vacuum turntable. Vacuum is applied to the vacuum turntable while bakery products are loaded thereon and positioned in a predetermined pattern. Once the bakery products are positioned on the turntable in the predetermined pattern, an air assist is applied to the vacuum turntable while the bakery products are unloaded therefrom. The air assist eliminates contact between the wrappers of the wrapped bakery product and the upper surface of the turntable thereby eliminating disorientation of the bakery products within the wrappers.

1 Claim, 50 Drawing Sheets

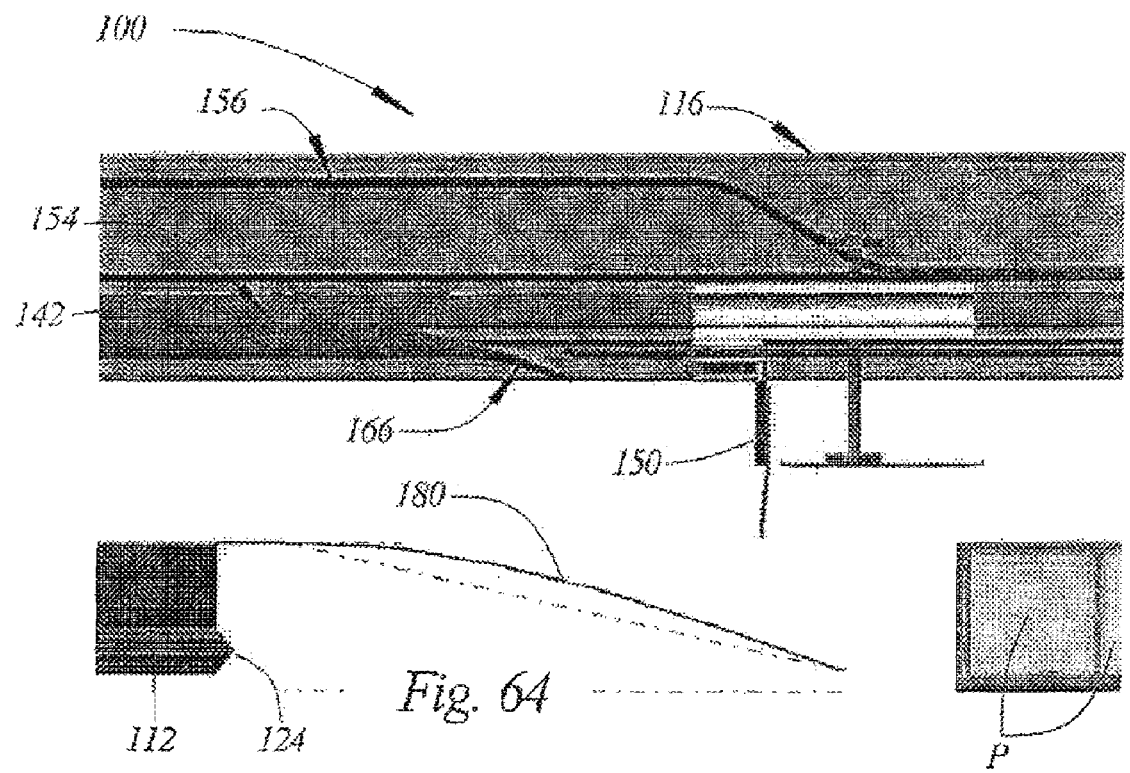
Fig. 64
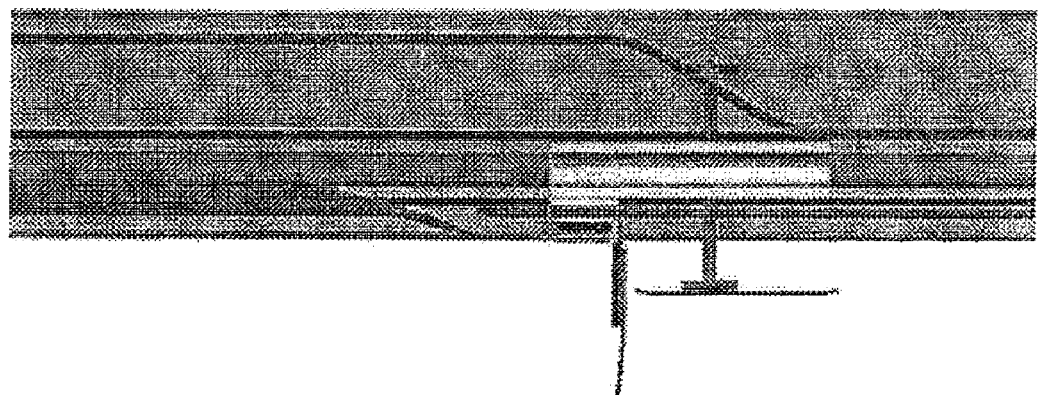
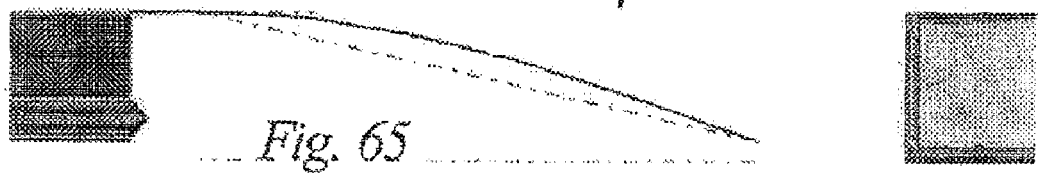
Fig. 65

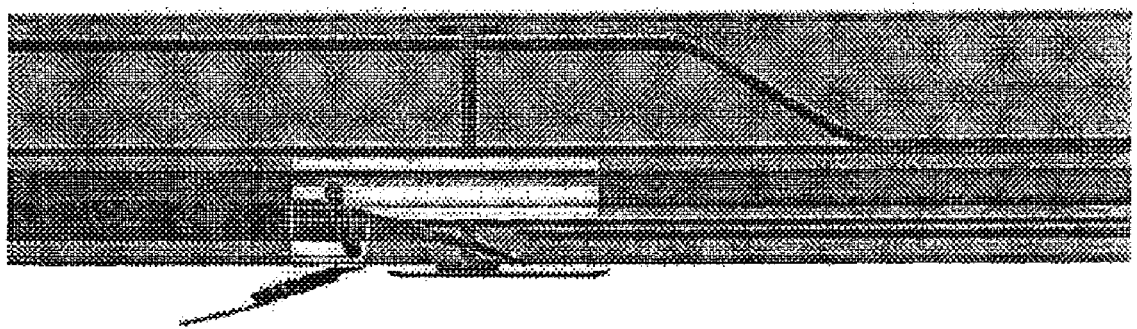
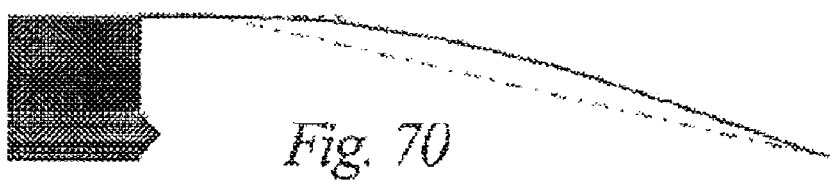
Fig. 70
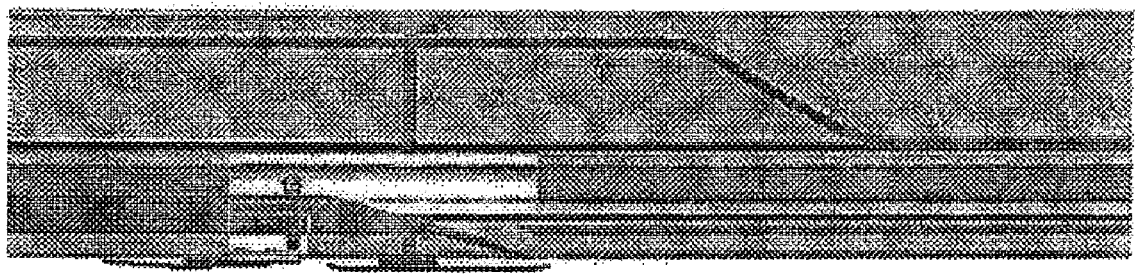
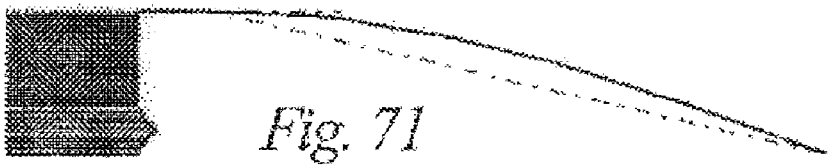
Fig. 71

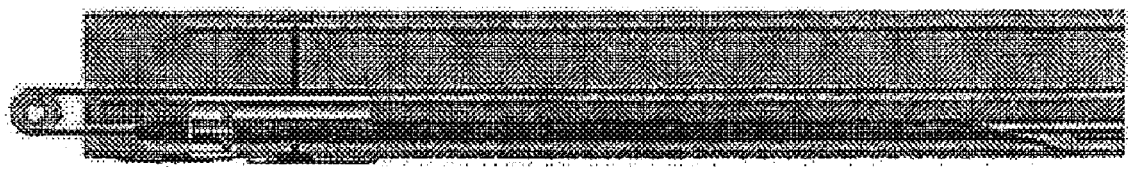
Fig. 75
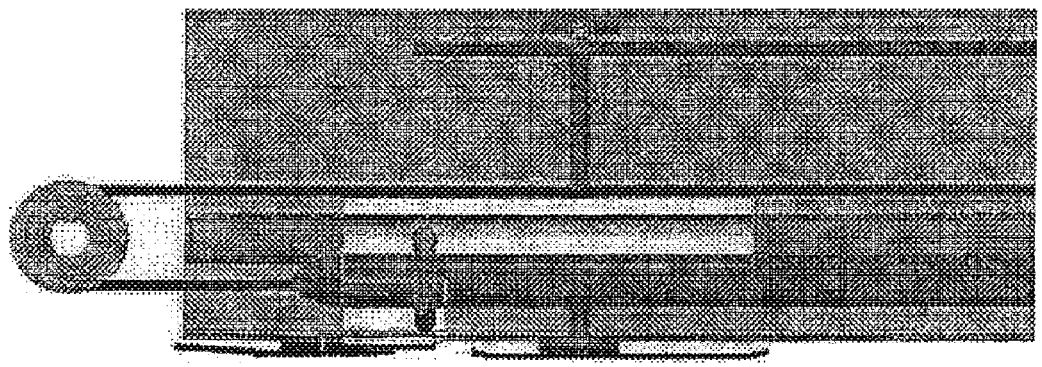
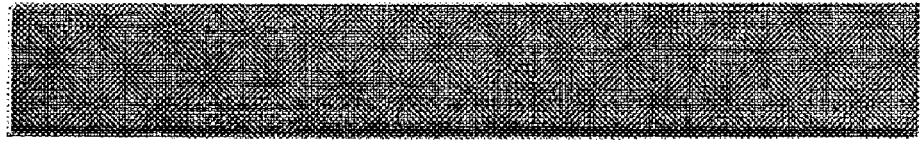
Fig. 76

PATTERN FORMER FOR WRAPPED BAKERY PRODUCTS AND METHOD FOR LOADING AND UNLOADING BAKERY PRODUCTS

CROSS-REFERENCE TO RELATED APPLICATIONS

This application is a divisional of application Ser. No. 11/249,992 filed Oct. 13, 2005 now U.S. Pat. No. 7,305,806, the entire contents of which are incorporated herein by reference; which is a continuation-in-part of application Ser. No. 11/070,649, filed Mar. 2, 2005, now U.S. Pat. No. 7,076,934, the entire contents of which are incorporated herein by reference; which is a continuation of application Ser. No. 10/794,443 filed Mar. 5, 2004, now U.S. Pat. No. 6,862,869, the entire contents of which are incorporated herein by reference; which is a continuation-in-part of application Ser. No. 10/093,242 filed Mar. 8, 2002, now U.S. Pat. No. 6,766,631, the entire contents of which are incorporated herein by reference; which is a continuation of application Ser. No. 09/587,127 filed Jun. 2, 2000, now U.S. Pat. No. 6,401,435, the entire contents of which are incorporated herein by reference; which claims the benefit of application Ser. No. 60/159,627 filed Oct. 14, 1999 the entire contents of which are incorporated herein by reference.

TECHNICAL FIELD

This invention relates generally to pattern formers for bakery products, and more particularly to a method and apparatus for assembling wrapped bakery products into predetermined patterns prior to the loading thereof into bakery trays.

BACKGROUND AND SUMMARY OF THE INVENTION

The operation of a modern commercial bakery in the manufacture of bakery products such as sliced bread loaves begins with the preparation of dough which is deposited into baking pans, proofed, and baked. Thereafter, the baked loaves of bread are removed from the pans, cooled, sliced, wrapped in plastic film, and loaded into bakery trays for delivery to retail outlets.

As is well known, bread and other wrapped bakery products such as hamburger buns, hot dog buns, etc. are available in a seemingly infinite number of sizes. However, commercial bakeries do not typically provide bakery trays which are configured to receive particular bakery products. Rather, commercial bakeries typically employ one type, or at most a few types, of bakery trays which are used to receive and transport a wide variety of bakery products.

Prior to being loaded into bakery trays, bakery products are arranged in predetermined patterns, the purpose being to assure the most efficient loading of a particular tray configuration with a particular bakery product to be received therein. In addition to loading efficiency, the positioning of the tails of the wrapped bakery products, that is, the openable ends thereof which are tied or otherwise secured during transport, is also taken into consideration. Preferably, the tails of the wrapped bakery products face inwardly thereby preventing snagging or tearing during transport.

The apparatus that is used to arrange wrapped bakery products in predetermined patterns prior to the loading thereof into bakery trays is known as a pattern former. Typically, a pattern former receives individually wrapped bakery products from the wrapping apparatus, arranges the received wrapped bakery products in groups comprising between 1 and about 6 wrapped bakery products, assembles at least 2 and as many as several groups of wrapped bakery products relative to one another to form the predetermined pattern, then positions the entire pattern of wrapped bakery products in a bakery tray for transport.

U.S. Pat. No. 4,522,292 granted to Euverard, et al. on Jun. 11, 1985; U.S. Pat. No. 4,856,263 granted to Schneider, et al. on Aug. 15, 1989; and U.S. Pat. No. 5,317,859 granted to Schneider, et al. on Jun. 7, 1994 illustrate and describe prior art pattern formers. The pattern formers of the prior art are relatively complex in design and are therefore costly to purchase and maintain. Perhaps more importantly, prior art pattern formers are relatively slow in operation, achieving the maximum rate of about 60 loaves per minute. This means that several of the prior art pattern formers are required in order to fill bakery trays with wrapped bakery products at a rate that is compatible with the output of a typical bakery product wrapping apparatus.

The present invention comprises an improved pattern former for wrapped bakery products which overcomes the foregoing and other deficiencies which have long since characterized the prior art. In particular, the pattern former of the present invention has an operational speed of 100 loaves per minute which means that a significantly smaller number of pattern formers is required in order to fulfill the pattern forming requirements of the modern commercial baking operation. This results in substantial savings to the bakery operator both in terms of initial cost and in terms of maintenance requirements.

The use of pattern formers incorporating the present invention is also advantageous in that pattern formers constructed in accordance with the invention are adapted to receive wrapped bakery products along the same axis and from the same bakery product inputting devices that have been used to supply pattern formers of the prior art, and to deliver filled bakery trays along the same axis and to the same bakery tray receiving apparatus that has been used with prior art pattern formers. This means that the pattern former of the present invention can be installed in an existing bakery without reconfiguring the bakery and without repositioning the apparatus which deliver wrapped bakery products to and receive filled bakery trays from the pattern former.

More particularly, the pattern former of the present invention employs a vacuum turntable to receive groups of wrapped bakery products and to assemble the groups of wrapped bakery products into patterns. The use of the vacuum turntable of the present invention is advantageous in that, by means thereof wrapped bakery products are received and accurately positioned within predetermined patterns without damage either to the bakery products or the wrapping thereof.

The pattern former of the present invention further includes apparatus for transferring groups of wrapped bakery products onto the vacuum turntable while simultaneously assembling a second group of wrapped bakery products. A similar apparatus transfers patterns of wrapped bakery products into bakery trays while a subsequent pattern is simultaneously being formed. As will be appreciated by those skilled in the art, the ability of the pattern former of the present invention to perform multiple tasks simultaneously significantly increases the throughput rate of the pattern former.

The present invention further comprises a method of forming patterns of wrapped bakery products and thereafter unloading the patterned wrapped bakery products into bakery trays including the steps of providing a vacuum turntable having perforations therethrough, applying vacuum to the vacuum turntable while bakery products are loaded thereon, and creating an air assist while the patterned wrapped bakery products are unloaded from the vacuum turntable onto bakery trays for further processing. The method of the present invention is facilitated by a three-position valve located beneath the vacuum turntable. In its first position the valve establishes vacuum through the perforations of the turntable while the bakery products are loaded and arranged thereon. The second position of the valve defines a static position wherein air is not flowing through the perforations of the turntable. In its third position the valve directs air flow upwardly through the perforations of the turntable creating an air assist while the patterned bakery products are unloaded into a bakery tray. The air assist eliminates contact between the wrapped bakery products and the turntable thereby eliminating damage to bakery products.

BRIEF DESCRIPTION OF THE DRAWINGS

A more complete understanding of the invention may be had by reference to the following Detailed Description when taken in conjunction with the accompanying Drawings, wherein:

FIG. 64 is an illustration of a subsequent step in the operation of the apparatus shown in FIGS. 5-11;

FIG. 65 is an illustration of a subsequent step in the operation of the apparatus shown in FIGS. 5-11;

FIG. 70 is an illustration of a subsequent step in the operation of the apparatus shown in FIGS. 5-11;

FIG. 71 is an illustration of a subsequent step in the operation of the apparatus shown in FIGS. 5-11;

FIG. 75 is an illustration of a subsequent step in the operation of the apparatus shown in FIGS. 5-11;

FIG. 76 is an illustration of a subsequent step in the operation of the apparatus shown in FIGS. 5-11;

DETAILED DESCRIPTION

Figure 1:
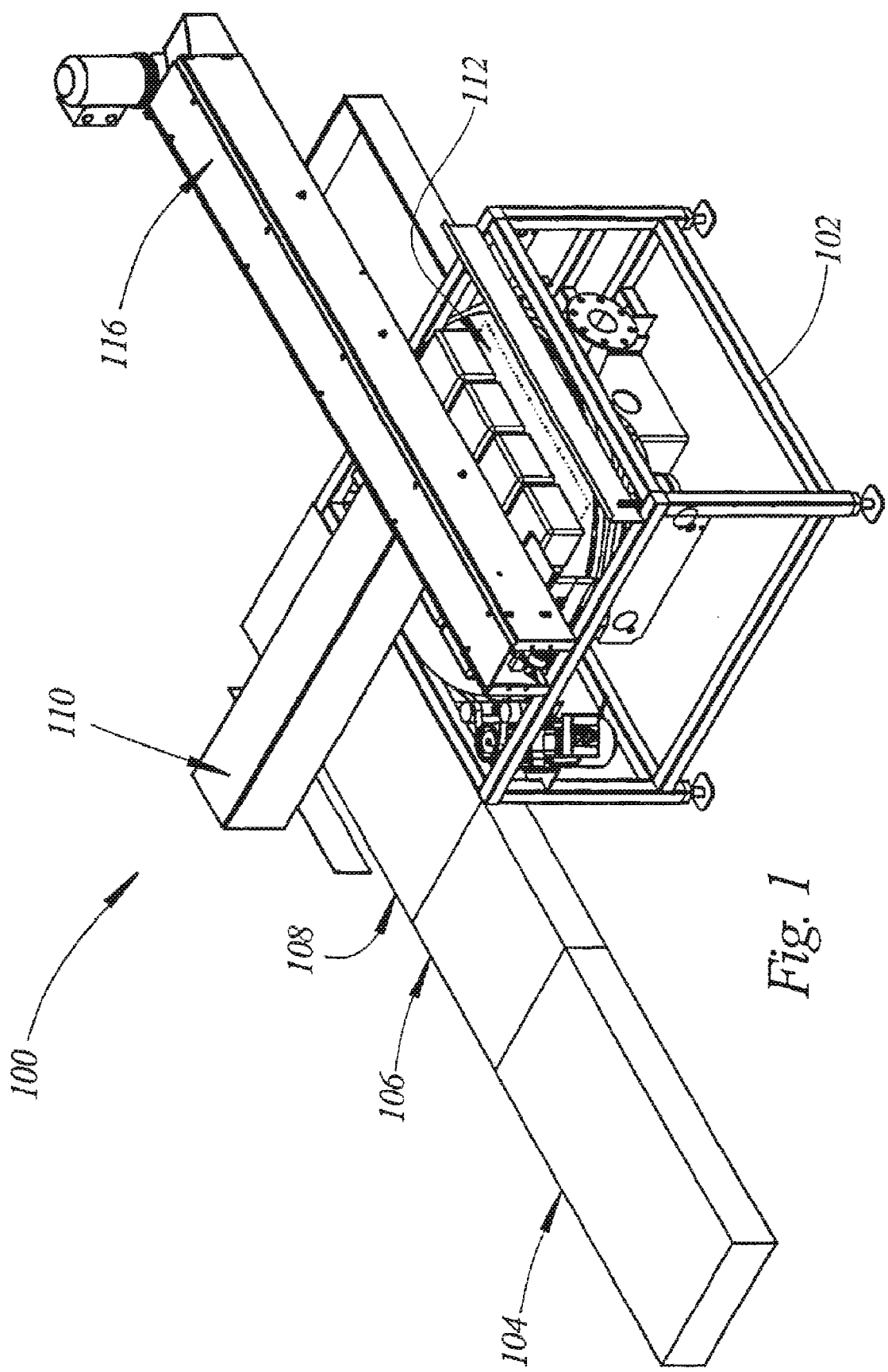
FIG. 1 is a perspective view of a pattern former incorporating the invention.

Referring now to the Drawings, and particularly to FIG. 1, there is shown a pattern former 100 incorporating the present invention. The pattern former 100 includes a frame 102 which supports the various component parts of the pattern former. The frame 102 is conventional in design and may comprise lengths of tubular, channel, or bar stock which are secured together by welding or by means of conventional fasteners.

The pattern former 100 includes an intake conveyor 104 which receives wrapped bakery products from a conventional wrapped bakery product inputting apparatus such as the delivery conveyor of a bakery product wrapping apparatus. A gating conveyor 106 receives wrapped bakery products from the intake conveyor 104 and delivers wrapped bakery products to a grouping apparatus 108. The intake conveyor 104, the gating conveyor 106, and the grouping apparatus 108 function to arrange wrapped bakery products received by the pattern former 100 in groups of wrapped bakery products, each group comprising from between 1 to about 6 wrapped bakery products depending on the particular pattern of wrapped bakery products to be formed.

The pattern former 100 further includes a transfer apparatus 110 which transfers groups of wrapped bakery products from the grouping apparatus 108 onto a vacuum turntable 112. An important feature of the present invention comprises the fact that the transfer apparatus 110 is adapted to transfer a first group of wrapped bakery products to the vacuum turntable 112 while a subsequent group of wrapped bakery products is being arranged on the grouping apparatus 108. The ability of the pattern former 100 of the present invention to perform these two functions simultaneously comprises a significant improvement over the prior art which results in the pattern former of the present invention having a significantly improved throughput rate when compared with prior art pattern formers.

The vacuum turntable 112 functions to receive groups of wrapped bakery products from the transfer apparatus 110 and to assemble the groups of wrapped bakery products into predetermined patterns. After a predetermined pattern of wrapped bakery products is formed, a transfer apparatus 116 transfers the pattern of wrapped bakery products from the vacuum turntable 112 to a bakery tray.

An important feature of the present invention comprises the fact that the transfer apparatus 116 is adapted to transfer a pattern of wrapped bakery products from the vacuum turntable 112 to a bakery tray while a subsequent pattern of wrapped bakery products is being assembled on the vacuum turntable 112. The ability of the pattern former 100 of the present invention to perform these two functions simultaneously comprises a significant improvement in that it substantially increases the throughput rate of the pattern former of the present invention when compared with prior art pattern formers.

Vacuum is applied to the vacuum turntable 112 by a vacuum generating apparatus 118 situated beneath the vacuum turntable 112. The vacuum generating apparatus 118 typically comprises a vacuum pump and a manifold connected to the vacuum pump for applying vacuum evenly across the entire diameter of the vacuum turntable 112. As will be appreciated by those skilled in the art, other types and kinds of vacuum generating apparatus may be utilized in the practice of the invention depending upon the requirements of particular applications thereof. The intensity of the vacuum that is applied to the vacuum turntable 112 is likewise dependent on the diameter of the vacuum turntable, the rotational speed at which the vacuum turntable is operated, and the types and kinds of wrapped bakery products which are handled by the vacuum turntable.

Figure 3:
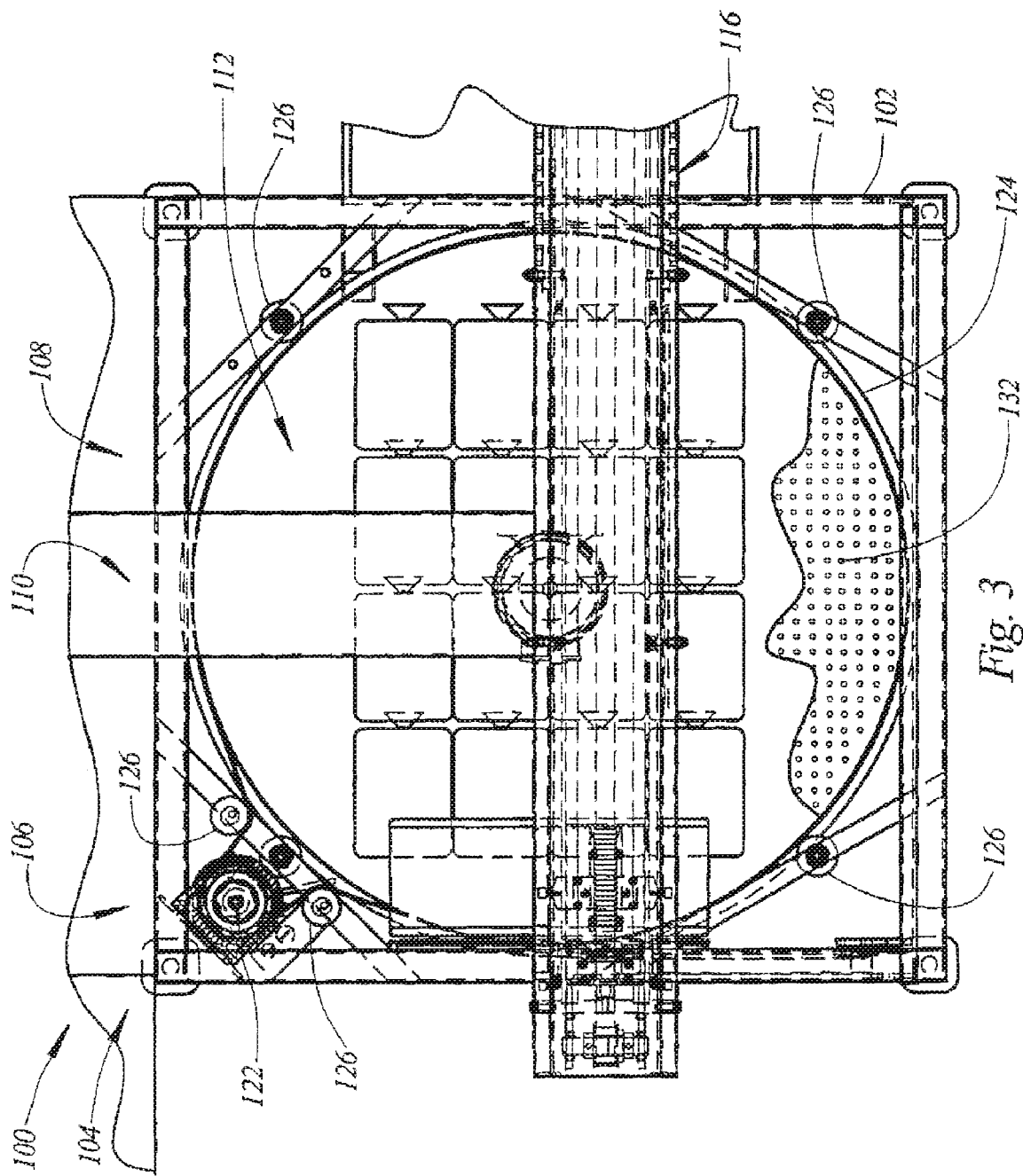
FIG. 3 is an enlargement of a portion of FIG. 2.
Figure 4:
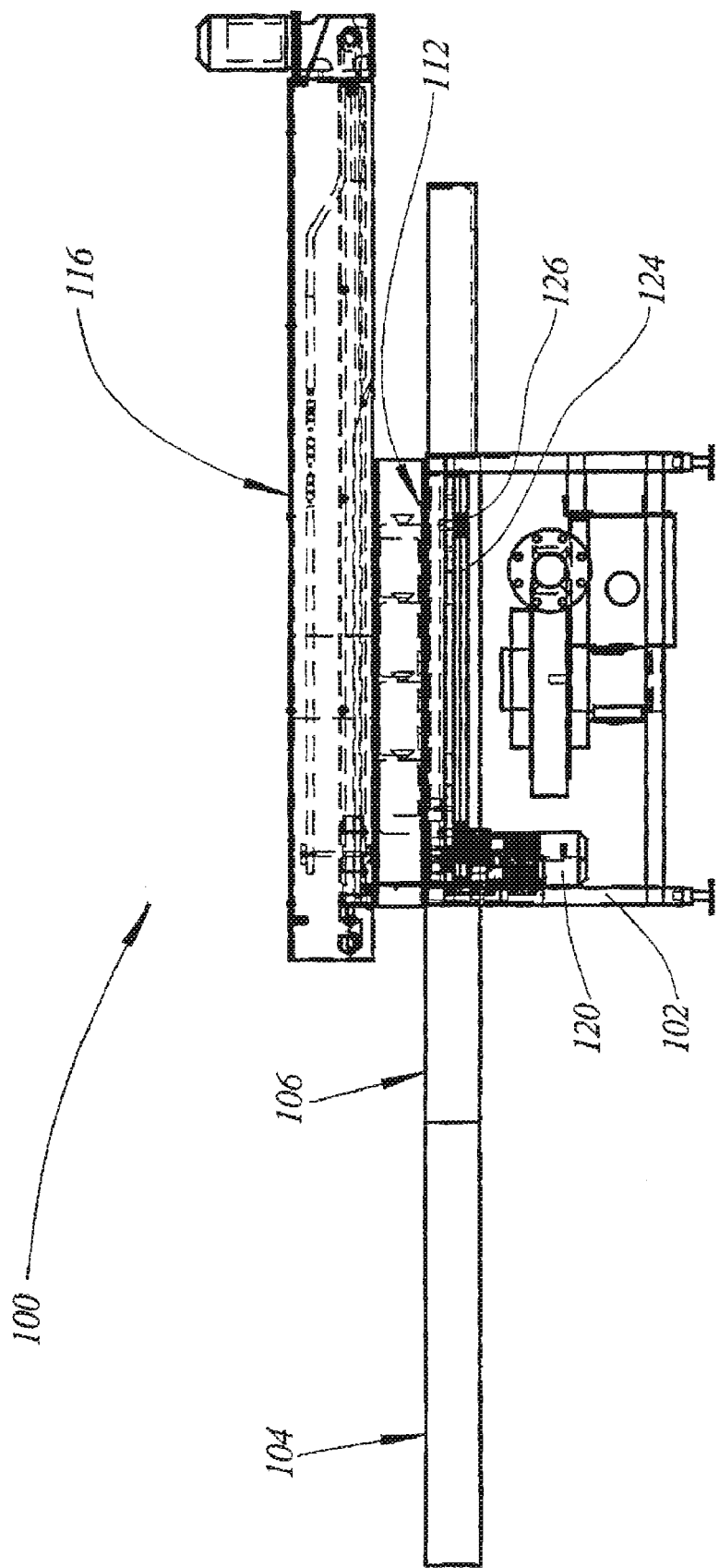
FIG. 4 is a side view of the pattern former of FIG. 1.
Figure 5:
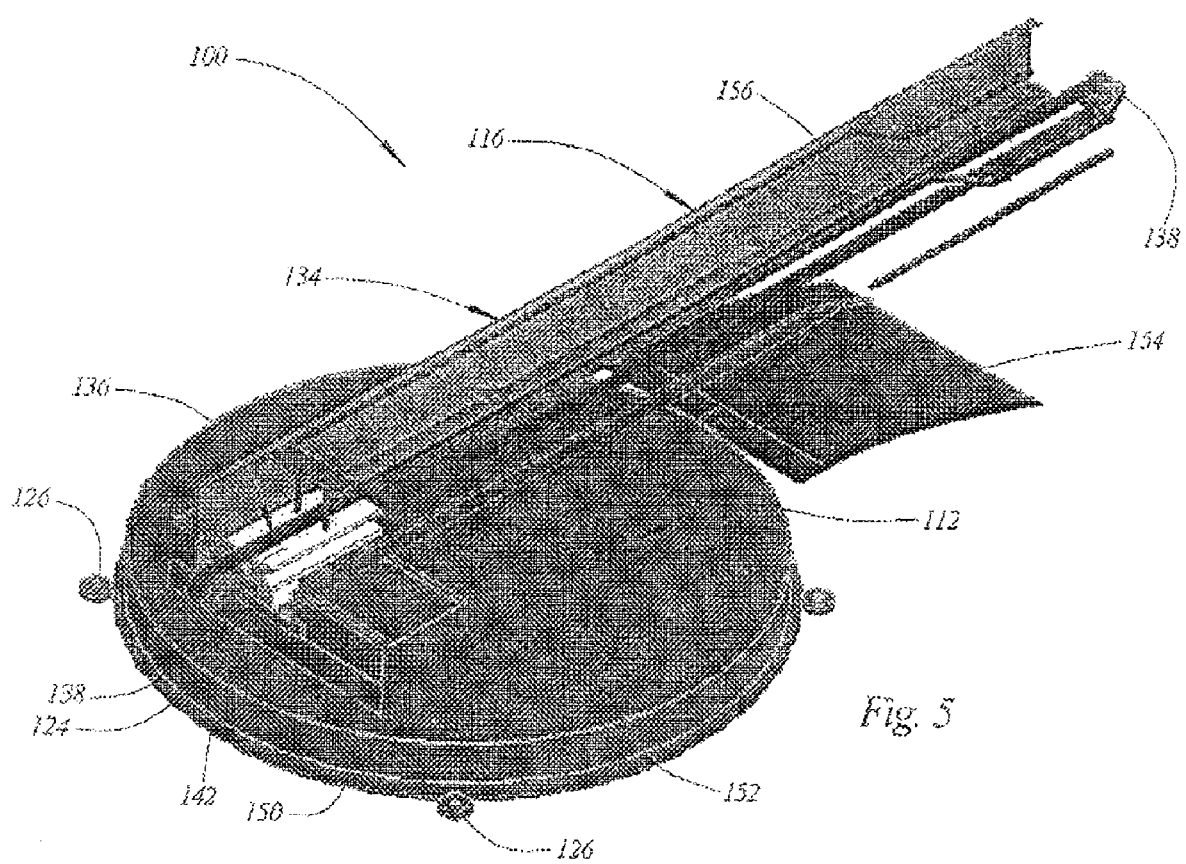
FIG. 5 is a perspective view illustrating the vacuum turntable and the apparatus for filling bakery trays with patterns of wrapped bakery products comprising the pattern former of FIG. 1.
Figure 6:
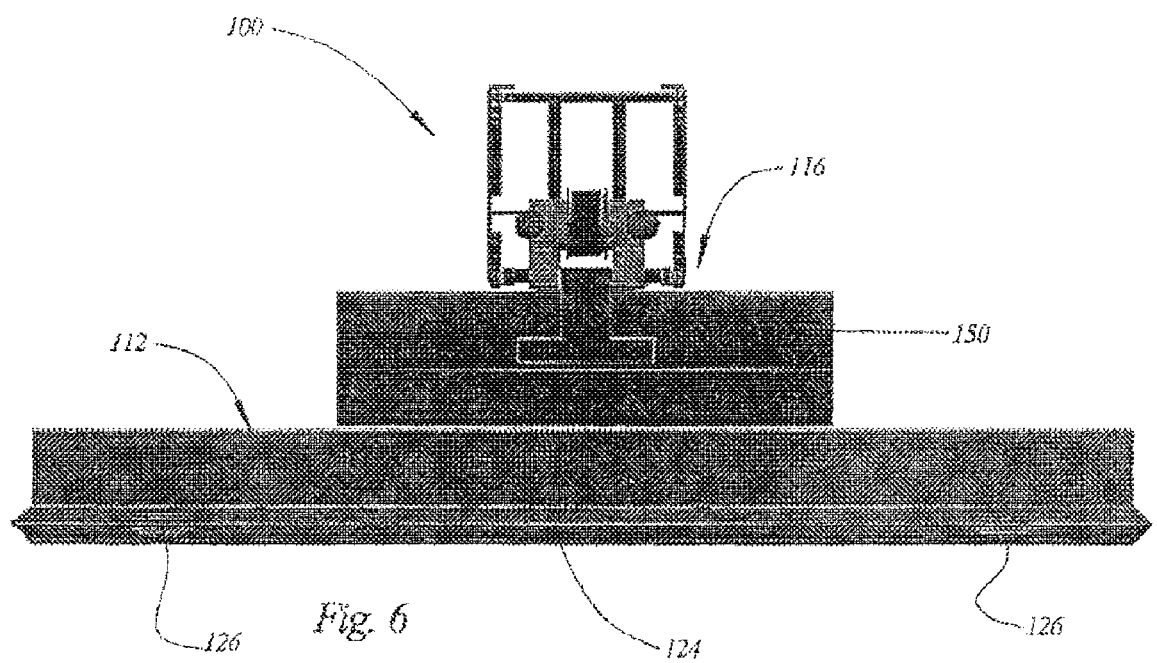
FIG. 6 is an end view of the apparatus of FIG. 5.
Figure 7:
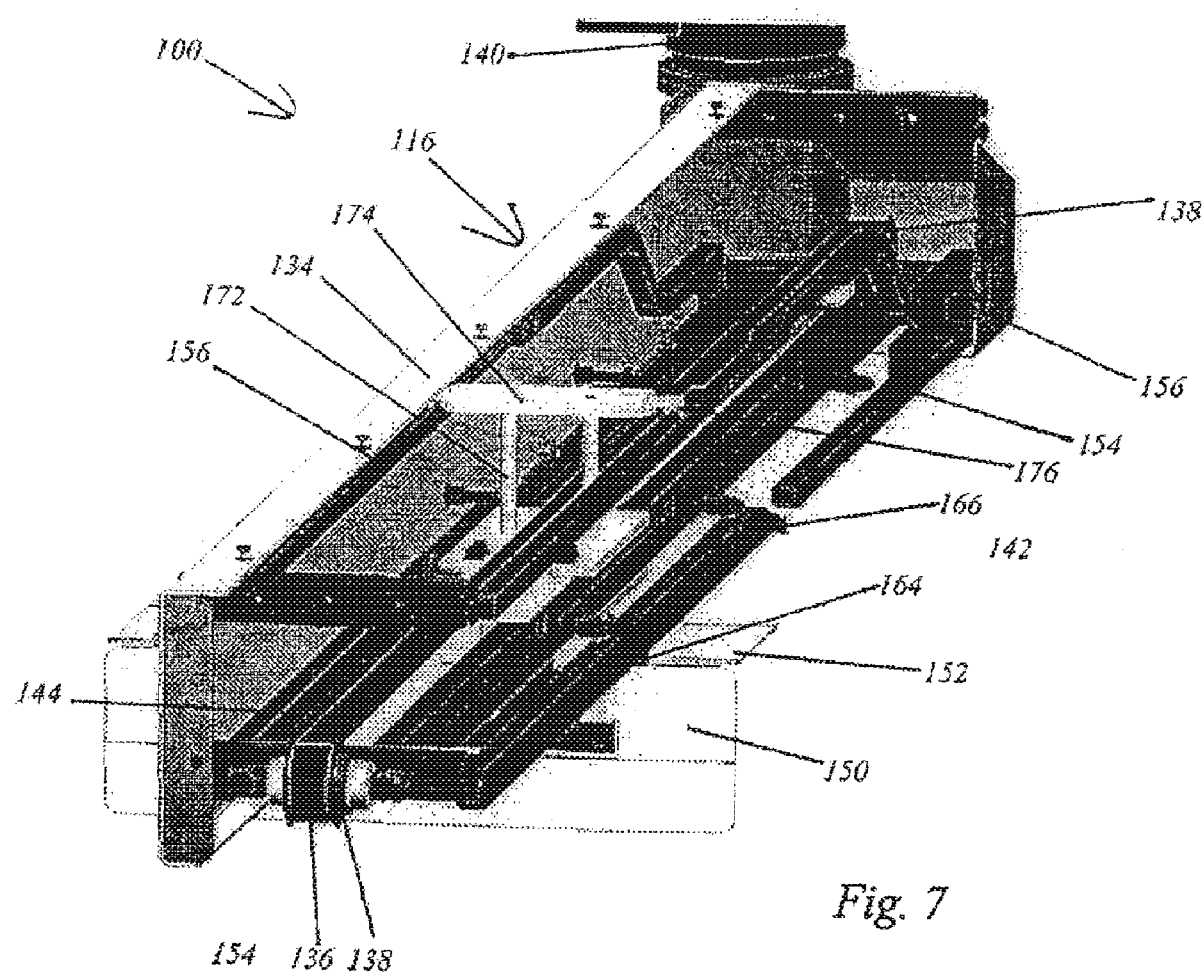
FIG. 7 is a front perspective view of the apparatus for transferring patterns of wrapped bakery products into bakery trays comprising the pattern former of FIG. 1.
Figure 8:
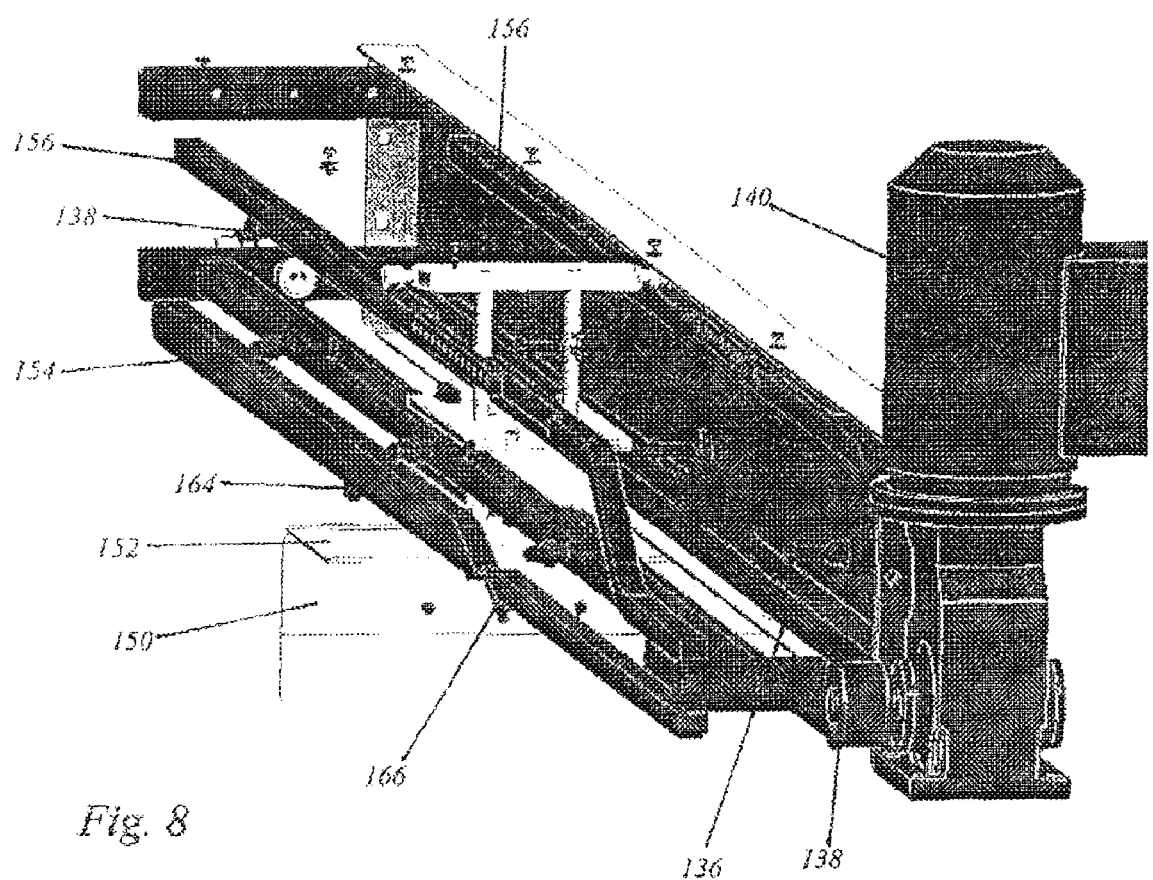
FIG. 8 is a rear perspective view of the apparatus of FIG. 7.
Figure 9:
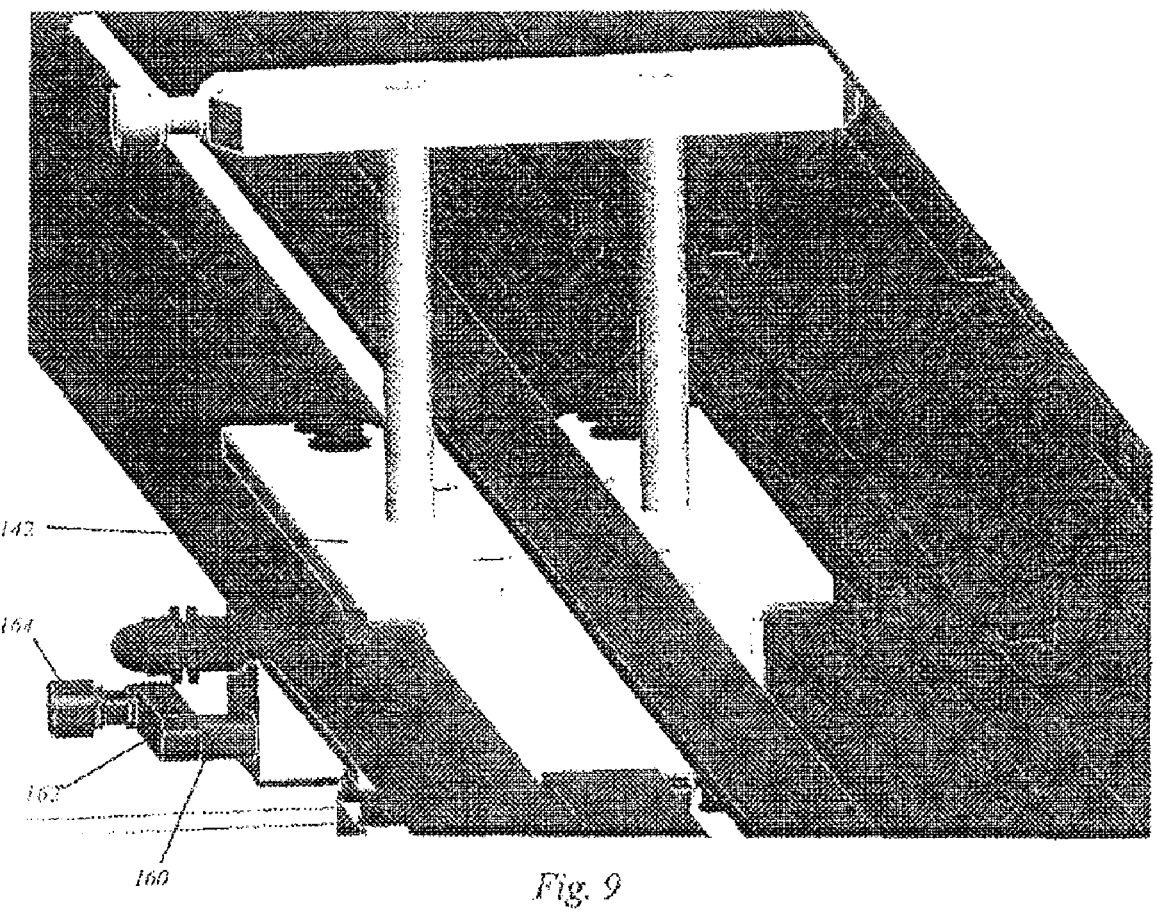
FIG. 9 is an enlargement of a portion of FIG. 8.
Figure 10:
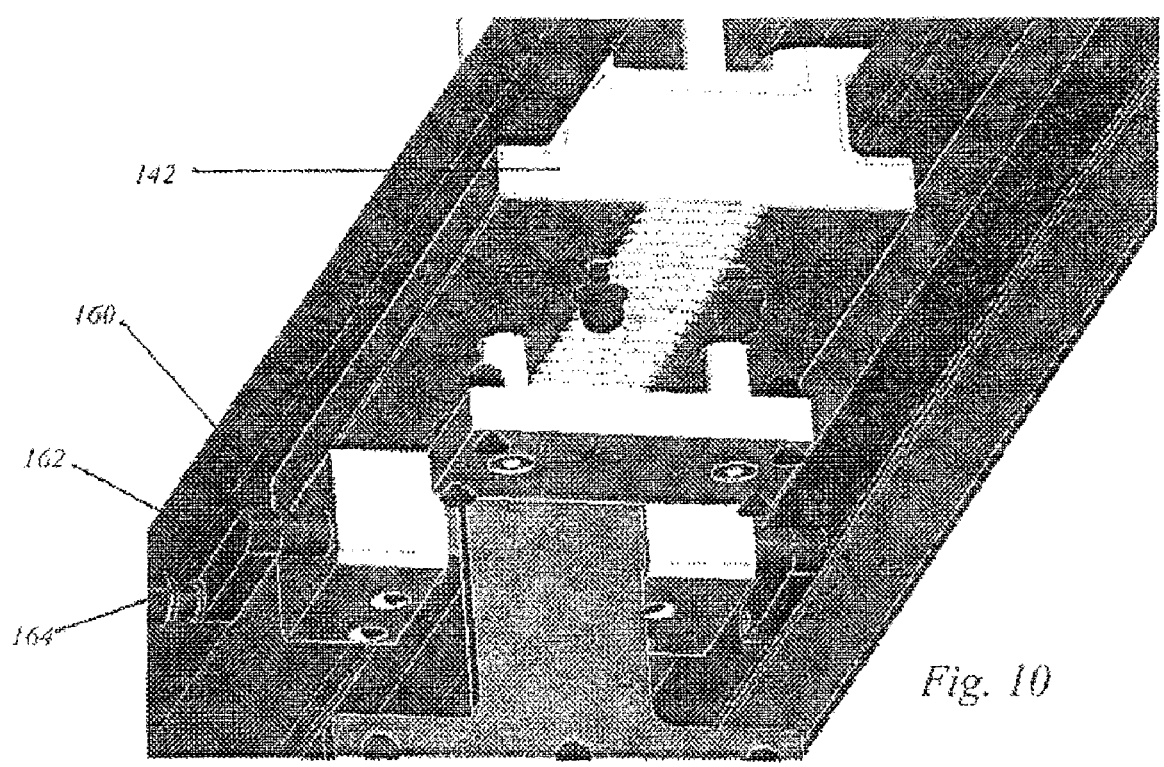
FIG. 10 is a bottom perspective view of a portion of the apparatus of FIG. 8.
Figure 11:
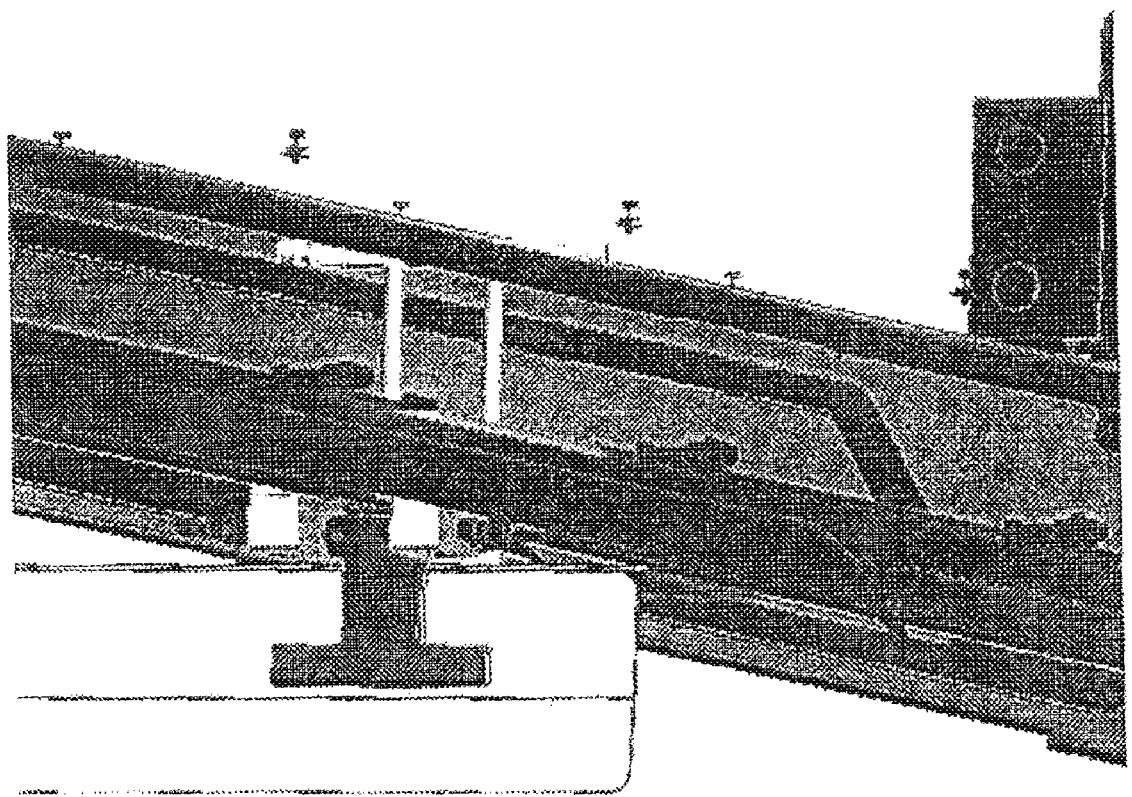
FIG. 11 is an enlargement of a portion of FIG. 7.

Referring particularly to FIGS. 3 and 4, the vacuum turntable 112 is driven by a motor 120. A pulley 122 is driven by the motor 120 and in turn drives a belt 124. The belt 124 extends entirely around the vacuum turntable 112 and functions to transfer operating power from the motor 120 to the vacuum turntable 112. The rotation of the vacuum turntable 112 is guided by a plurality of idler rollers 126 located at spaced intervals around the periphery of the vacuum turntable 112.

The use of the belt 124 to rotate the vacuum turntable 112 comprises an important feature of the invention. By means of the turntable drive system of the present invention, the high torque loads which are typically imposed on turntable drive shafts are eliminated. Perhaps more importantly, by eliminating the typical turntable drive shaft, the space directly beneath the turntable is made available for the vacuum generating apparatus 118 which applies vacuum to the turntable without interference from the turntable operating mechanism. In this manner, the vacuum is supplied uniformly across the entire diameter of the vacuum turntable 112.

The upper surface of the vacuum turntable 112 which engages the wrapped bakery products comprises a perforated plate 132. The diameter of the perforations comprising the plate 132 is preferably between about 0.0337 inches and about 0.0340 inches. The spacing between the holes comprising the perforated plate 132 is preferably between about 0.2186 inches and about 0.2225 inches. The thickness of the perforated plate 132 is preferably about 0.020 inches, however, thicker plates can also be used in the practice of the invention, if desired. Those skilled in the art will appreciate and understand the fact that the precise dimensions comprising the diameters of the perforations, the spacing between perforations, and the thickness of the perforated plate 132 of the vacuum turntable 112 can be varied in accordance with the requirements of particular applications of the invention.

The vacuum turntable 112 performs two very important functions in the operation of the pattern former 100. First, the vacuum turntable 112 decelerates individually wrapped bakery products comprising groups of wrapped bakery products which are moved onto the vacuum turntable 112 by the transfer apparatus 110. In this manner each wrapped bakery product comprising a group thereof is precisely positioned on the vacuum turntable 112 without danger of the wrapped bakery product moving beyond its intended location due to inertia. The vacuum turntable 112 also functions to firmly retain the wrapped bakery products received thereon during rotation of the vacuum turntable 112 to form the desired pattern of wrapped bakery products. This is true even if the wrapped bakery products are positioned near the outer circumference of the vacuum turntable 112. Perhaps most importantly, the vacuum turntable 112 properly decelerates wrapped bakery products received thereon and subsequently firmly retains the wrapped bakery products during rotation with no damage to the bakery products or the wrapping thereof.

FIGS. 5-11, inclusive, illustrate the construction and operation of the apparatus 116 which transfers patterns of wrapped bakery products from the vacuum turntable 112 to bakery trays for transportation from the bakery to retail outlets. The apparatus 116 includes a housing 134 which encloses a drive belt 136. The drive belt 136 moves along a course defined by pulleys 138 and is driven by a motor 140. A traveler 142 is secured to the drive belt 136 for movement thereby along a substantially horizontal course defined by slideways 144. The slideways 144 support the traveler 142 for movement under the action of the drive belt 136.

The traveler 142 supports a pusher plate 150 and a spanker plate 152. The pusher plate 150 is actuated by pusher plate cams 154 and the spanker plate 152 is actuated by spanker plate cams 156.

As is best shown in FIGS. 8, 9, 10, and 11, the pusher plate 150 is supported on a rod 160 which is pivotally supported on the traveler 142. A bell crank 162 extends from each end of the rod 160, and a cam follower 164 is supported at the distal end of each bell crank 162. The weight of the pusher plate 150 normally pivots the pusher plate 150 downwardly thereby pivoting the cam followers 164 upwardly and into engagement with camming surfaces comprising the lower surfaces of the pusher plate cams 154.

The pusher plate cams 154 include pivotally supported sections 166. As the pusher plate 150 moves away from the vacuum turntable 112 and toward the motor 140, the cam followers 164 engage the pivotally supported sections 166 which thereupon pivot upwardly allowing the cam followers 164 to continue in engagement with the lower camming surfaces of the pusher plate cams 154.

When the pusher plate 150 reaches the end of its travel away from the vacuum turntable 112 and toward the motor 140, the direction of movement of the drive belt 136 is reversed and the pusher plate 150 is moved in the opposite direction, i.e., away from the motor 140 and toward the vacuum turntable 112. The cam followers 164 engage the pivotally supported sections 166 of the pusher plate cams 154 thereby causing the cam followers 164 to ride upwardly and into engagement with upper camming surfaces comprising the pusher plate cams 154. Engagement of the cam followers 164 with the upper camming surfaces of the pusher plate cams 154 pivots the pusher plate 150 upwardly into an orientation in which it extends parallel to the pusher plate cams 154. This allows the pusher plate 150 to pass over a pattern of wrapped baked goods which has been assembled on the vacuum turntable 112 as the pusher plate 150 was moving a previously assembled pattern off the vacuum turntable 112 and into a bakery tray.

The spanker plate 152 is supported on rods 172 which are sidedly supported in the traveler 142. The rods 172 extend to a bar 174 which in turn extends to cam followers 176 which engage the spanker plate cams 156. As will be appreciated by those skilled in the art, the spanker plate cams 156 allow the spanker plate 152 to move downwardly as the traveler 142 reaches the limit of its travel in the direction extending away from the vacuum turntable 112 and towards the motor 140. As the traveler 142 begins its reverse movement, i.e., away from the motor 140 and toward the vacuum turntable 112, the spanker plate cams 156 return the spanker plate 152 to the position illustrated in FIGS. 5-11, inclusive.

Figure 12:
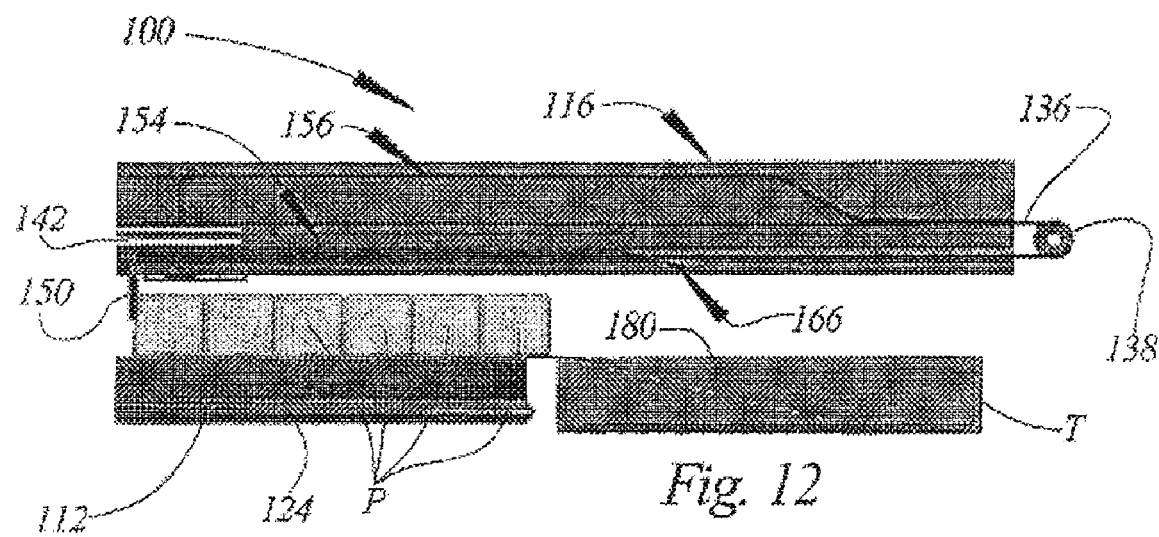
FIG. 12 is an illustration of an initial step in the operation of the apparatus shown in FIGS. 5-11.
Figure 13:
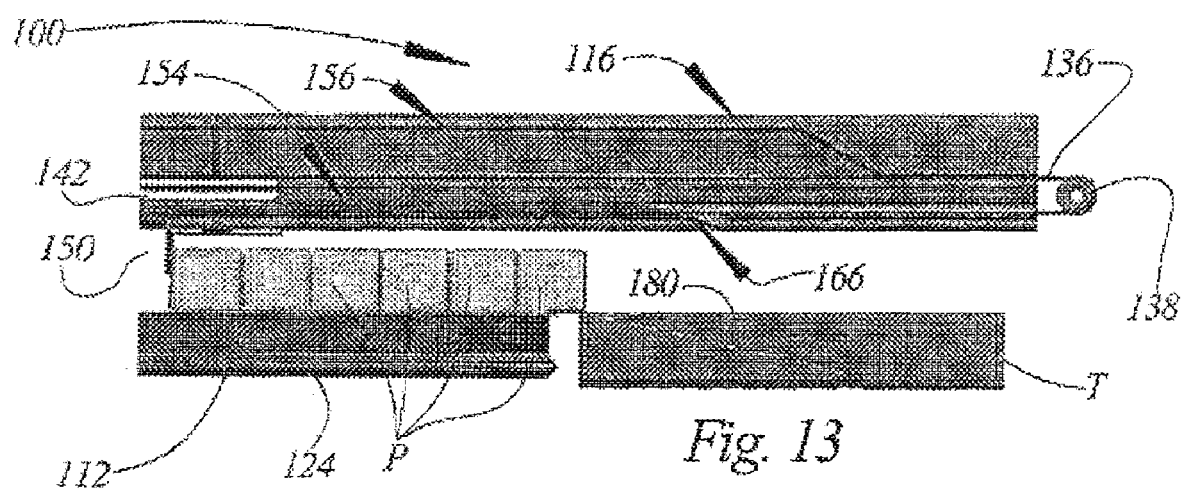
FIG. 13 is an illustration of a subsequent step in the operation of the apparatus shown in FIGS. 5-11.
Figure 14:
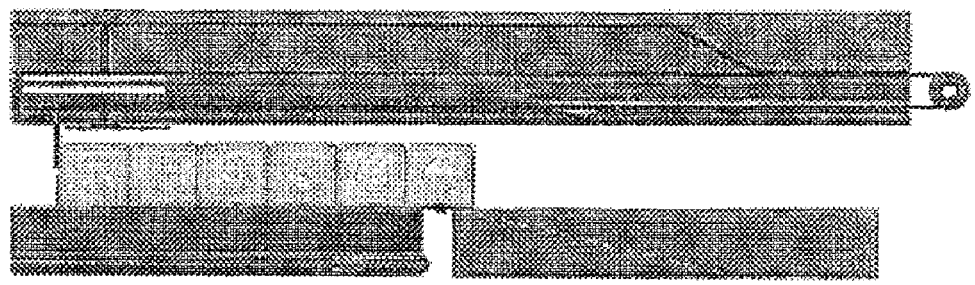
FIG. 14 is an illustration of a subsequent step in the operation of the apparatus shown in FIGS. 5-11.
Figure 15:
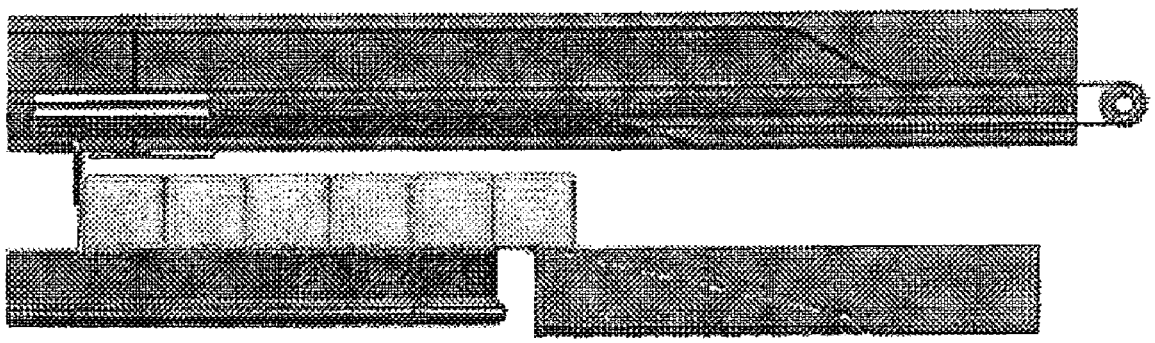
FIG. 15 is an illustration of a subsequent step in the operation of the apparatus shown in FIGS. 5-11.
Figure 16:
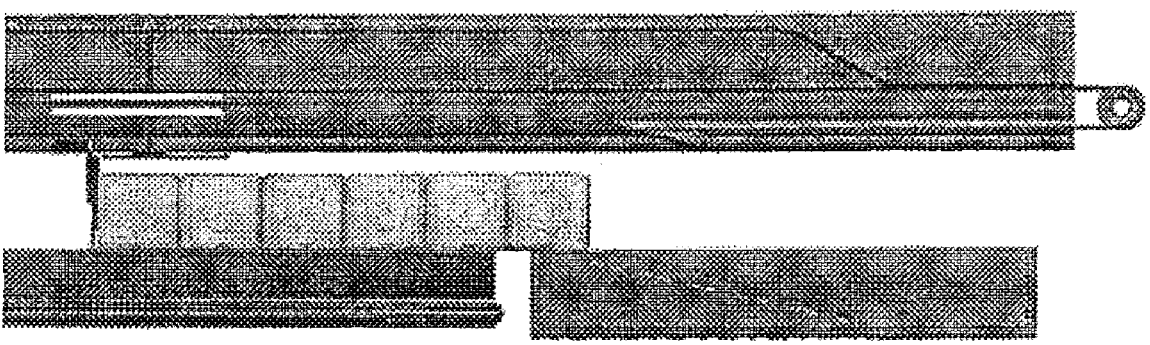
FIG. 16 is an illustration of a subsequent step in the operation of the apparatus shown in FIGS. 5-11.
Figure 17:
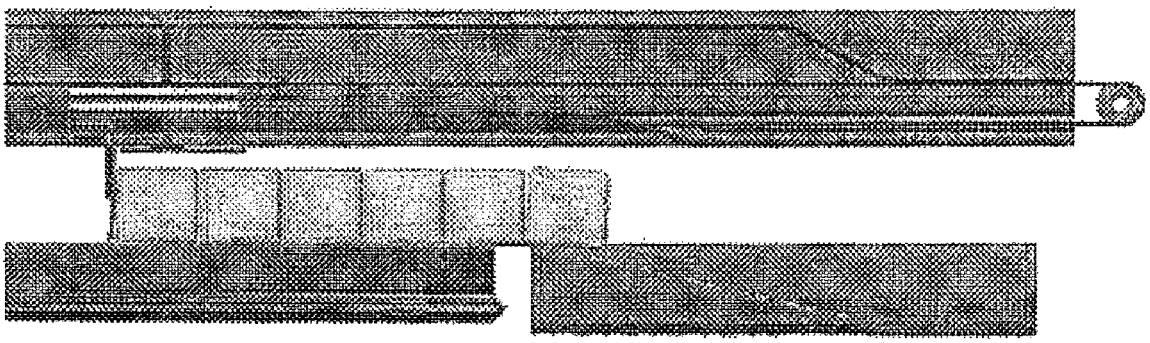
FIG. 17 is an illustration of a subsequent step in the operation of the apparatus shown in FIGS. 5-11.
Figure 18:
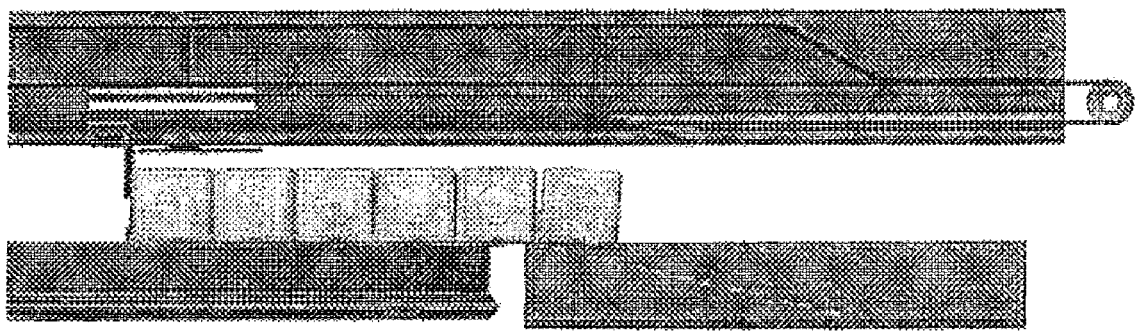
FIG. 18 is an illustration of a subsequent step in the operation of the apparatus shown in FIGS. 5-11.
Figure 19:
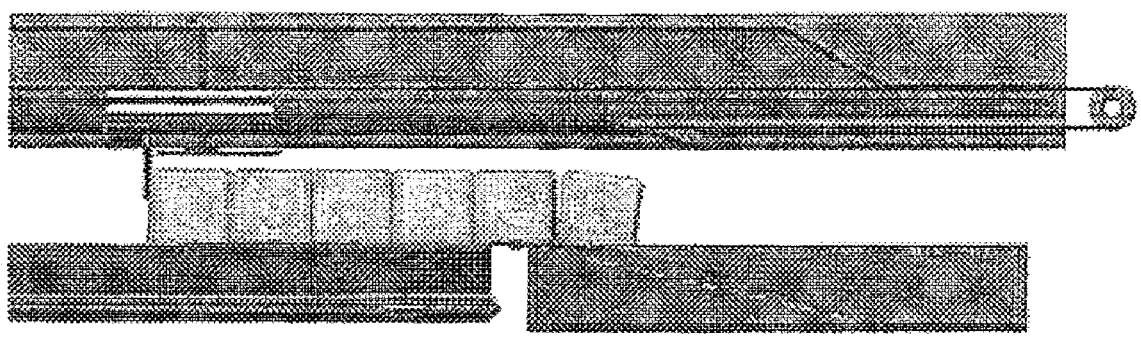
FIG. 19 is an illustration of a subsequent step in the operation of the apparatus shown in FIGS. 5-11.
Figure 20:
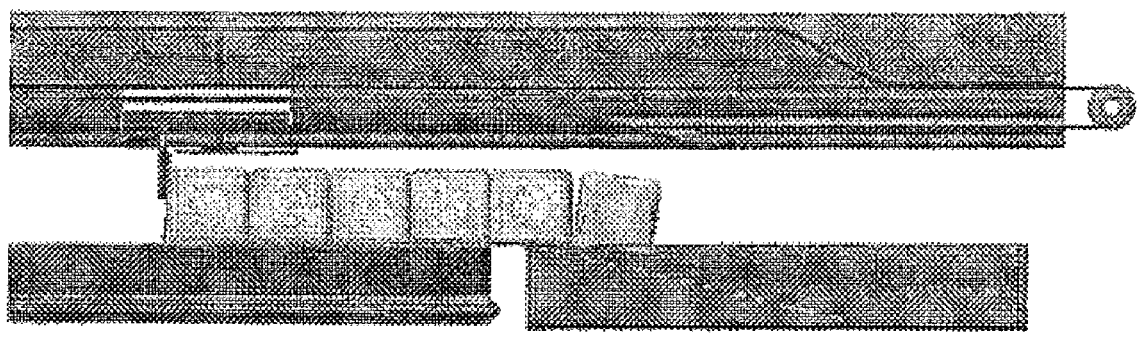
FIG. 20 is an illustration of a subsequent step in the operation of the apparatus shown in FIGS. 5-11.
Figure 21:
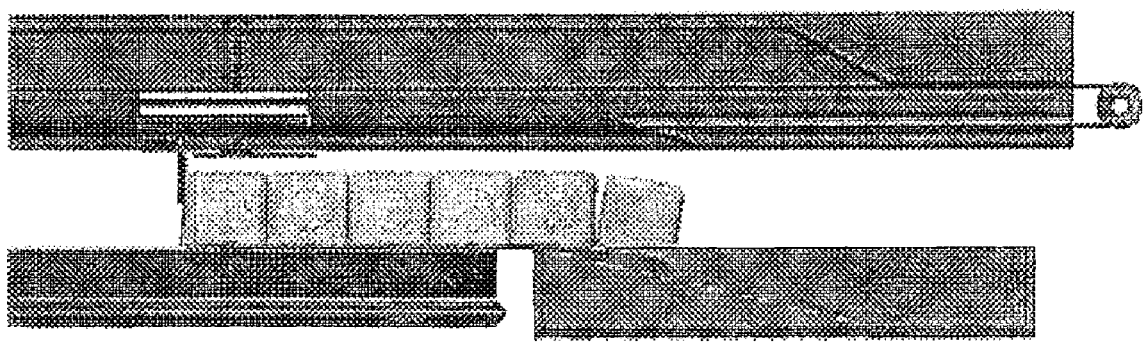
FIG. 21 is an illustration of a subsequent step in the operation of the apparatus shown in FIGS. 5-11.
Figure 22:
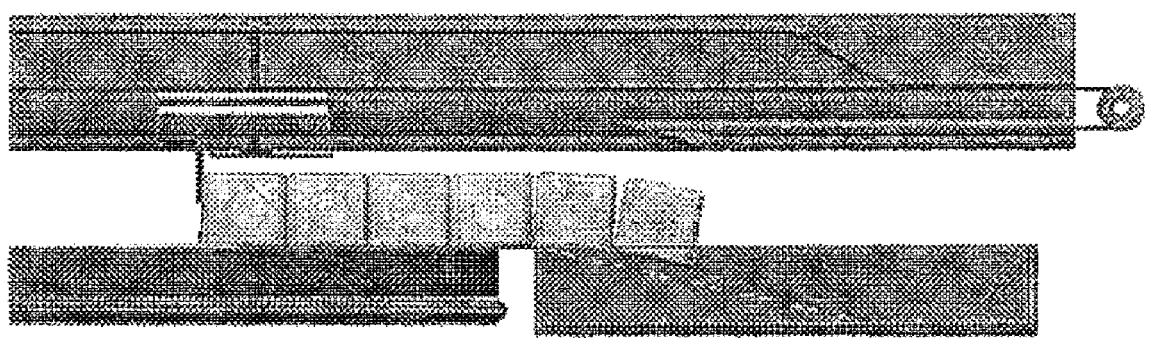
FIG. 22 is an illustration of a subsequent step in the operation of the apparatus shown in FIGS. 5-11.
Figure 23:
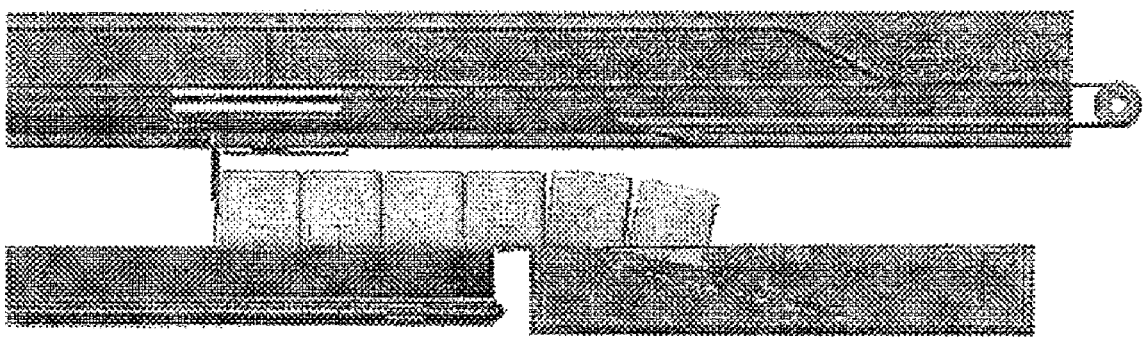
FIG. 23 is an illustration of a subsequent step in the operation of the apparatus shown in FIGS. 5-11.
Figure 24:
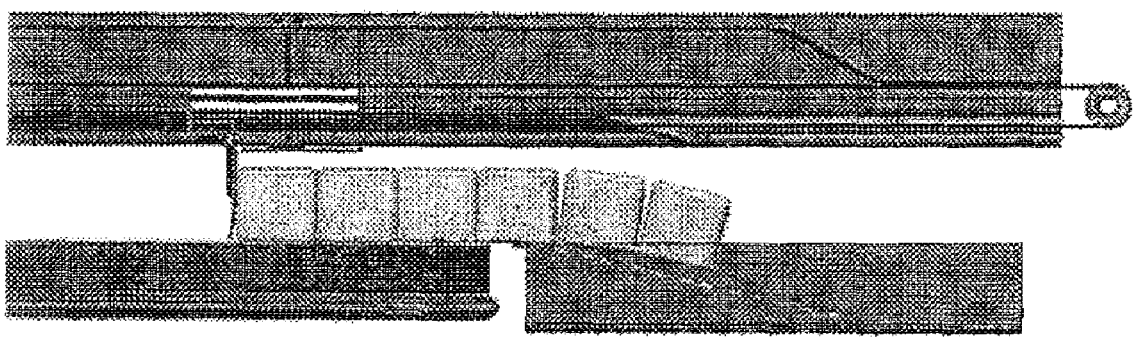
FIG. 24 is an illustration of a subsequent step in the operation of the apparatus shown in FIGS. 5-11.
Figure 25:
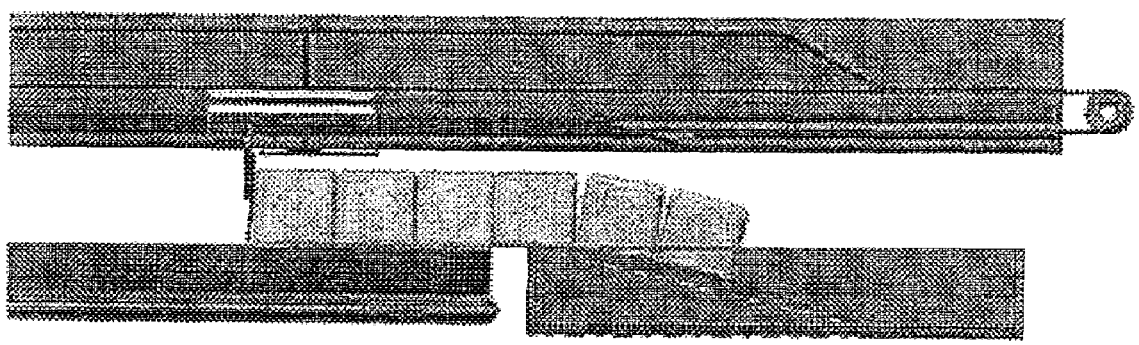
FIG. 25 is an illustration of a subsequent step in the operation of the apparatus shown in FIGS. 5-11.
Figure 26:
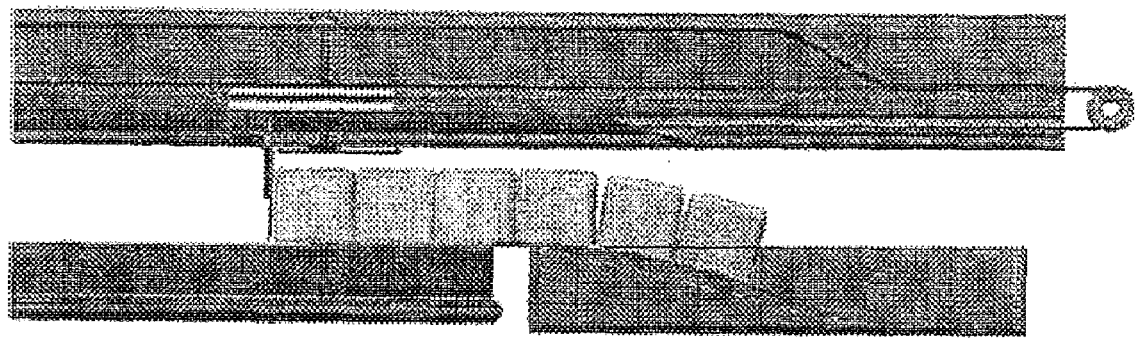
FIG. 26 is an illustration of a subsequent step in the operation of the apparatus shown in FIGS. 5-11.
Figure 27:
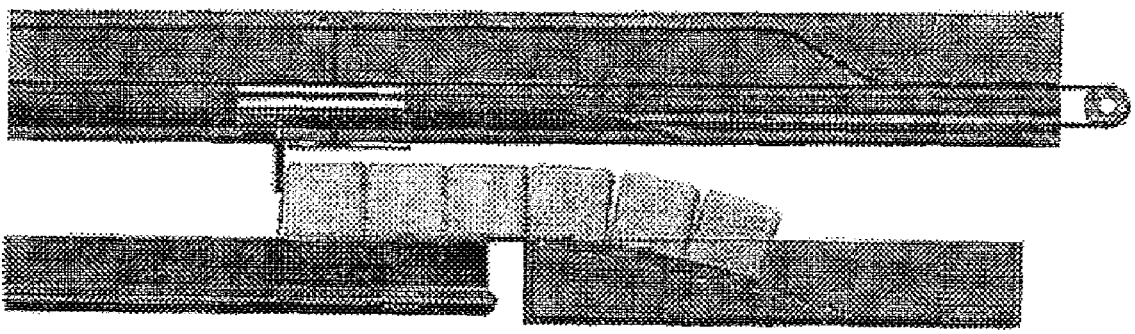
FIG. 27 is an illustration of a subsequent step in the operation of the apparatus shown in FIGS. 5-11.
Figure 28:
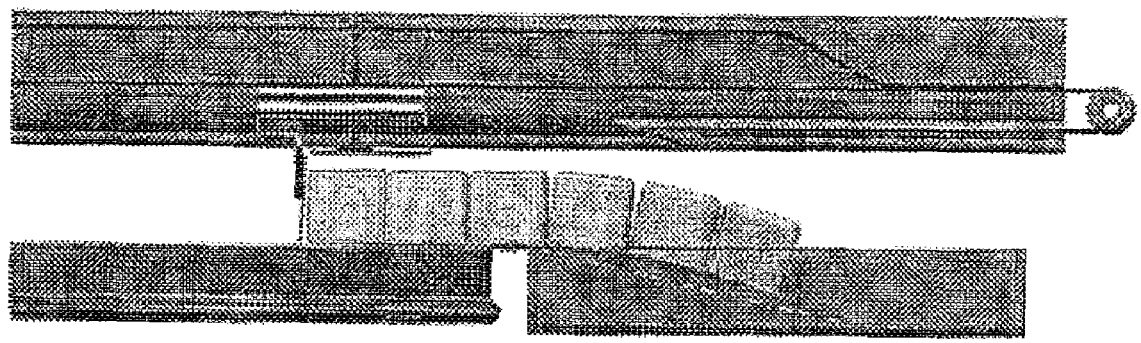
FIG. 28 is an illustration of a subsequent step in the operation of the apparatus shown in FIGS. 5-11.
Figure 29:
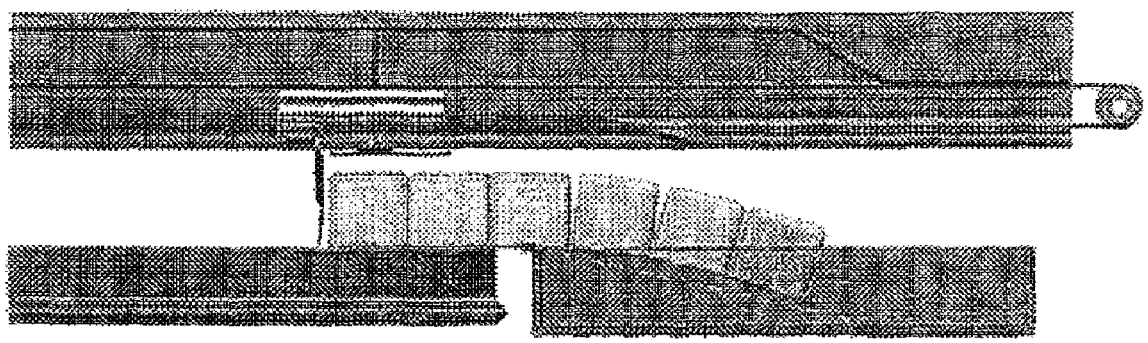
FIG. 29 is an illustration of a subsequent step in the operation of the apparatus shown in FIGS. 5-11.
Figure 30:
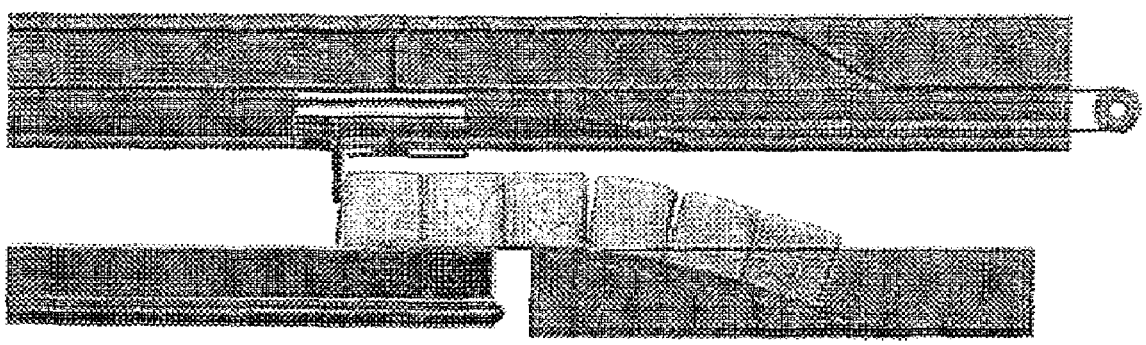
FIG. 30 is an illustration of a subsequent step in the operation of the apparatus shown in FIGS. 5-11.
Figure 31:
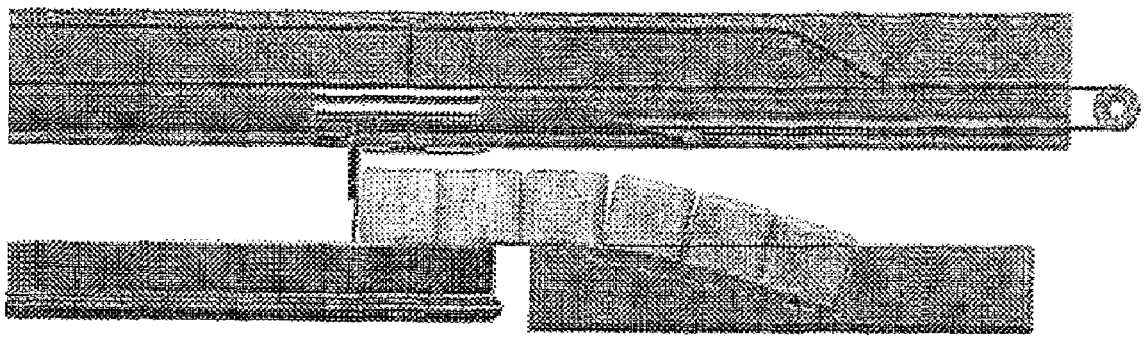
FIG. 31 is an illustration of a subsequent step in the operation of the apparatus shown in FIGS. 5-11.
Figure 32:
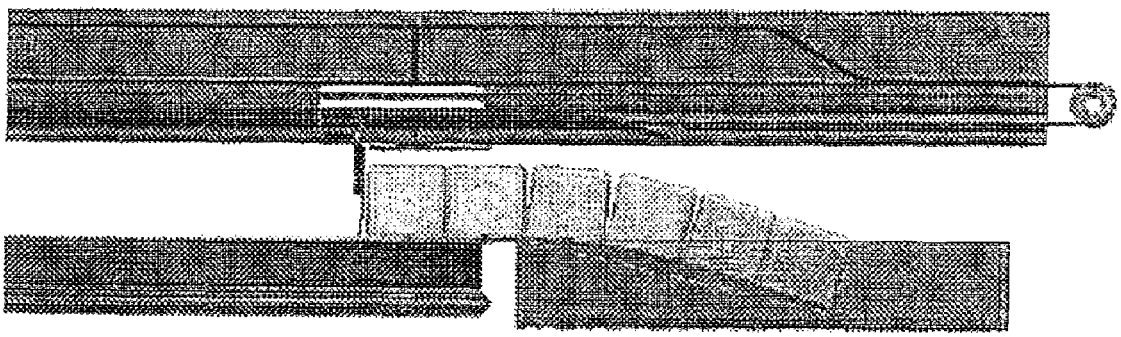
FIG. 32 is an illustration of a subsequent step in the operation of the apparatus shown in FIGS. 5-11.
Figure 33:
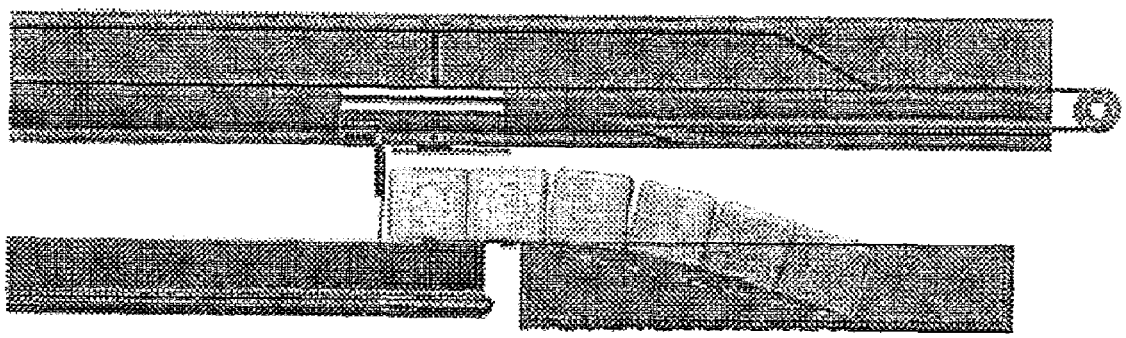
FIG. 33 is an illustration of a subsequent step in the operation of the apparatus shown in FIGS. 5-11.
Figure 34:
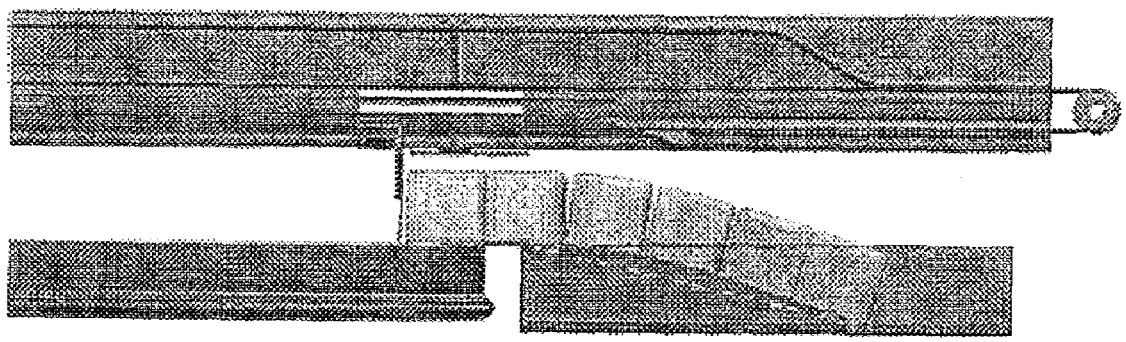
FIG. 34 is an illustration of a subsequent step in the operation of the apparatus shown in FIGS. 5-11.
Figure 35:
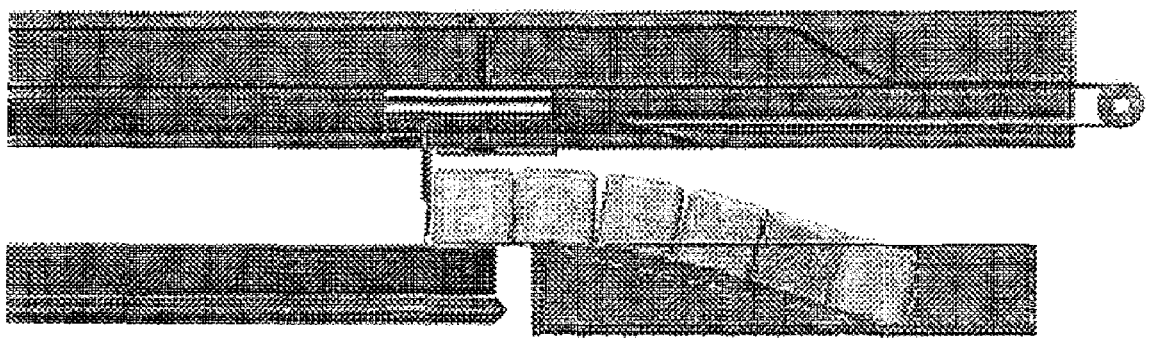
FIG. 35 is an illustration of a subsequent step in the operation of the apparatus shown in FIGS. 5-11.
Figure 36:
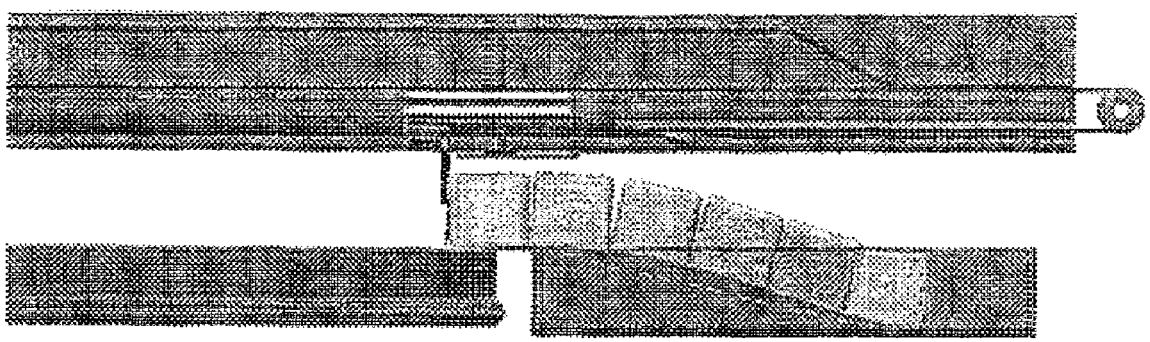
FIG. 36 is an illustration of a subsequent step in the operation of the apparatus shown in FIGS. 5-11.
Figure 37:
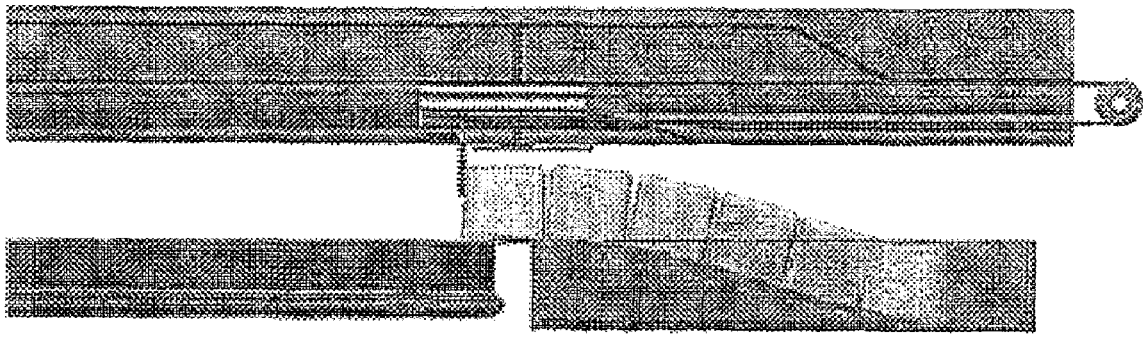
FIG. 37 is an illustration of a subsequent step in the operation of the apparatus shown in FIGS. 5-11.
Figure 38:
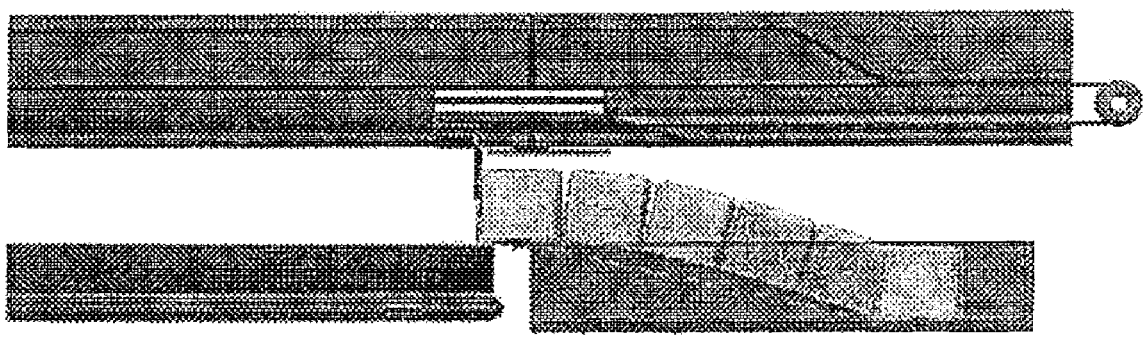
FIG. 38 is an illustration of a subsequent step in the operation of the apparatus shown in FIGS. 5-11.
Figure 39:
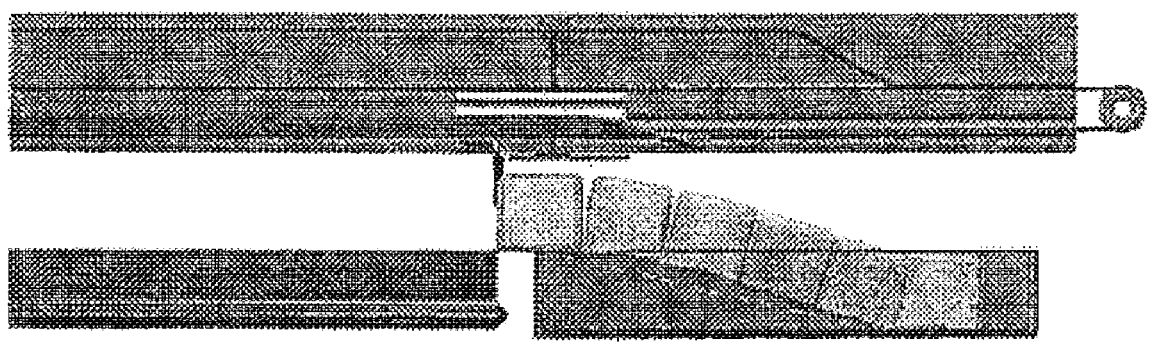
FIG. 39 is an illustration of a subsequent step in the operation of the apparatus shown in FIGS. 5-11.
Figure 40:
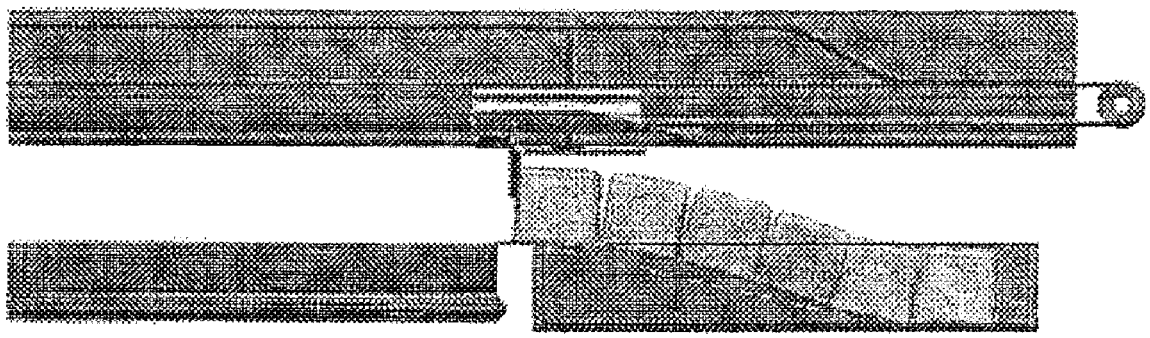
FIG. 40 is an illustration of a subsequent step in the operation of the apparatus shown in FIGS. 5-11.
Figure 41:
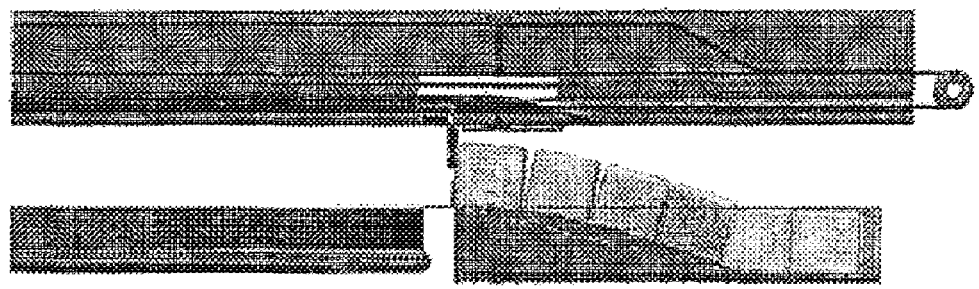
FIG. 41 is an illustration of a subsequent step in the operation of the apparatus shown in FIGS. 5-11.
Figure 42:
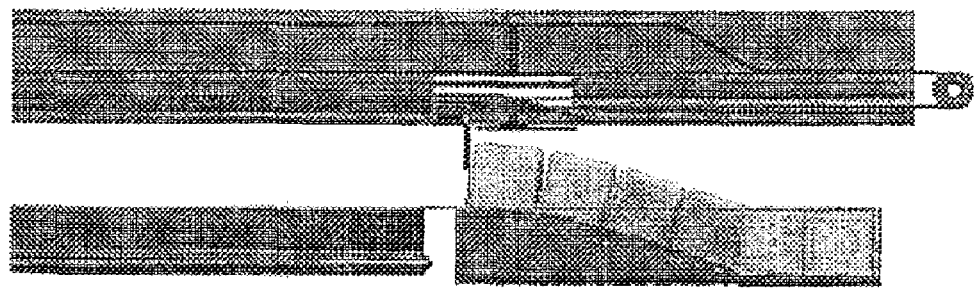
FIG. 42 is an illustration of a subsequent step in the operation of the apparatus shown in FIGS. 5-11.
Figure 43:
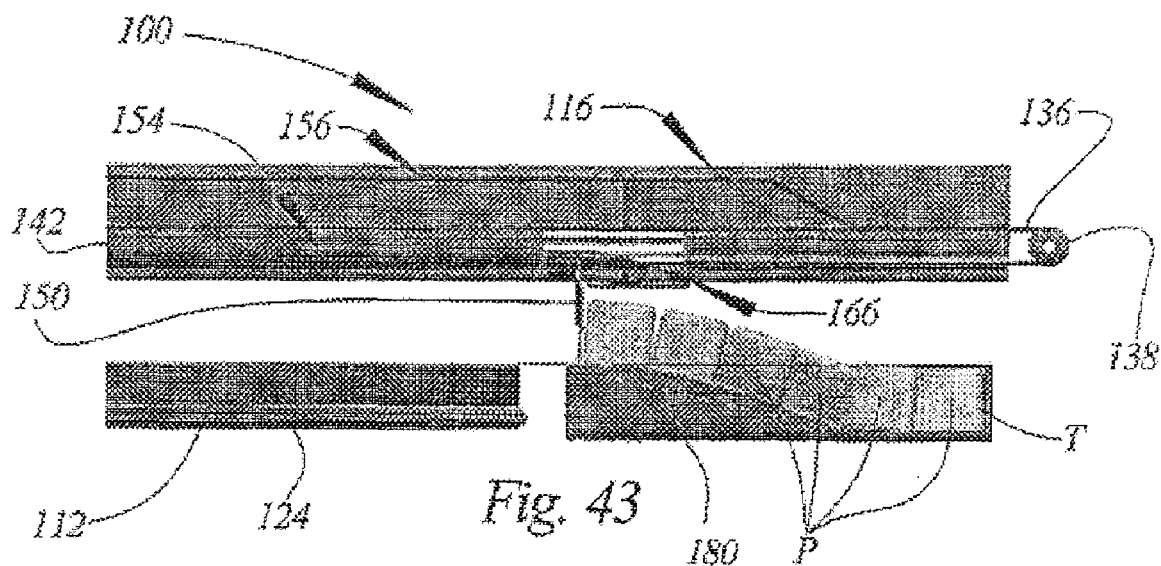
FIG. 43 is an illustration of a subsequent step in the operation of the apparatus shown in FIGS. 5-11.
Figure 44:
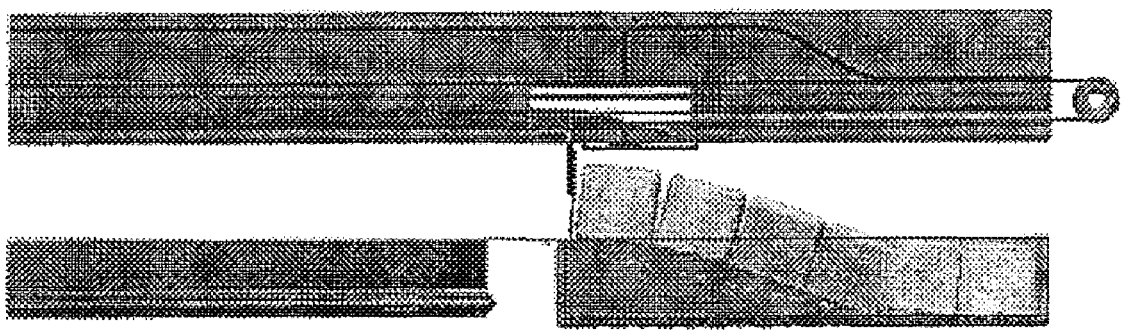
FIG. 44 is an illustration of a subsequent step in the operation of the apparatus shown in FIGS. 5-11.
Figure 45:
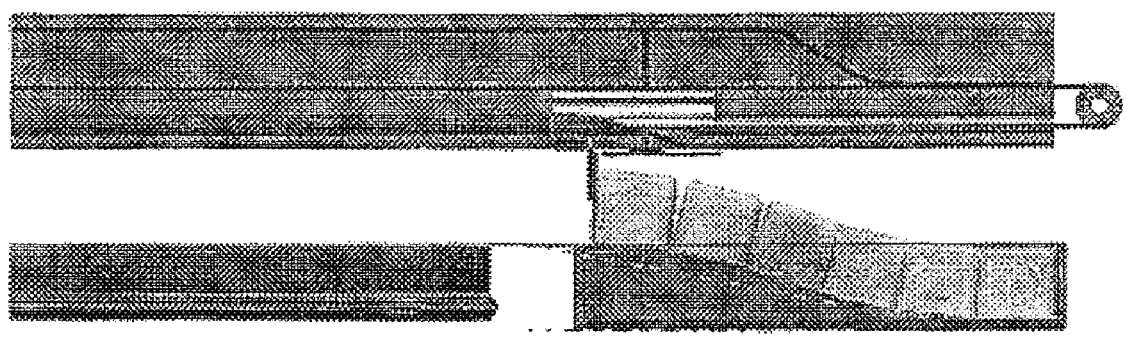
FIG. 45 is an illustration of a subsequent step in the operation of the apparatus shown in FIGS. 5-11.
Figure 46:
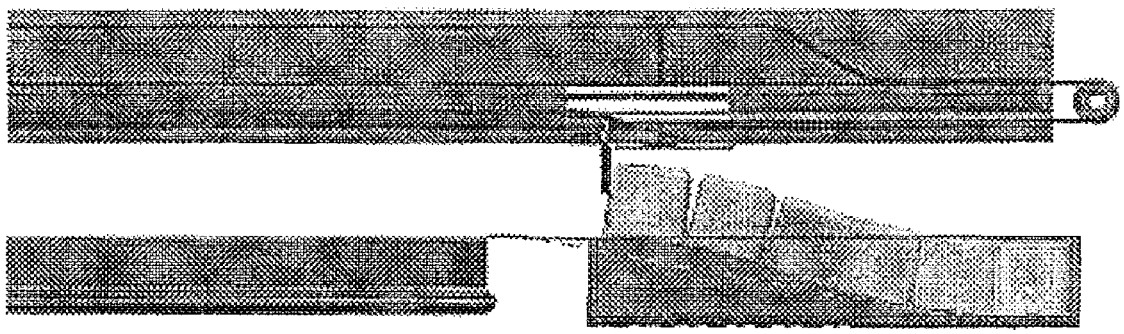
FIG. 46 is an illustration of a subsequent step in the operation of the apparatus shown in FIGS. 5-11.
Figure 47:
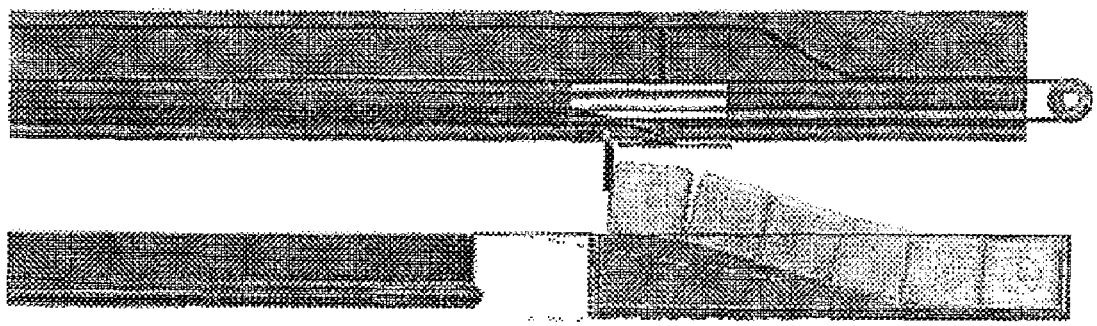
FIG. 47 is an illustration of a subsequent step in the operation of the apparatus shown in FIGS. 5-11.
Figure 48:
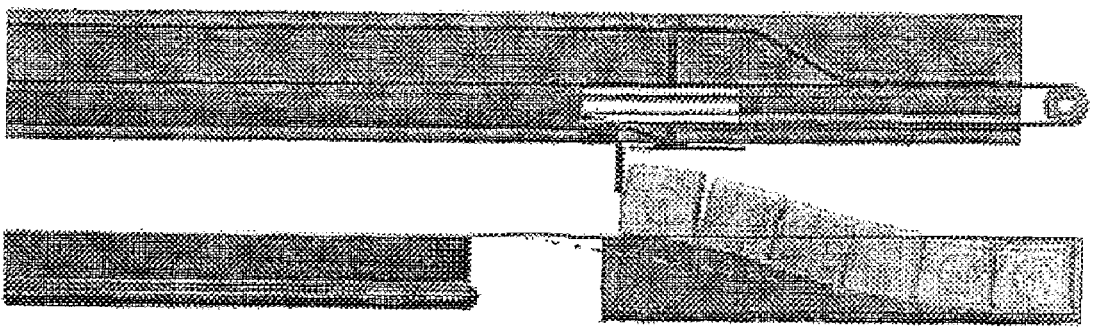
FIG. 48 is an illustration of a subsequent step in the operation of the apparatus shown in FIGS. 5-11.
Figure 49:
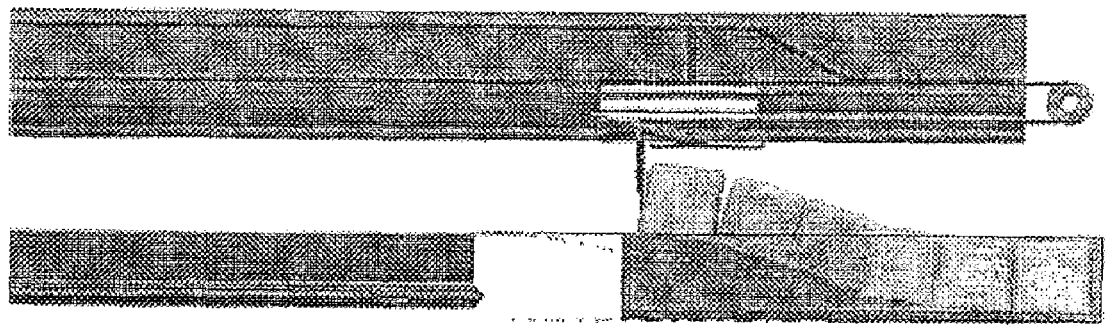
FIG. 49 is an illustration of a subsequent step in the operation of the apparatus shown in FIGS. 5-11.
Figure 50:
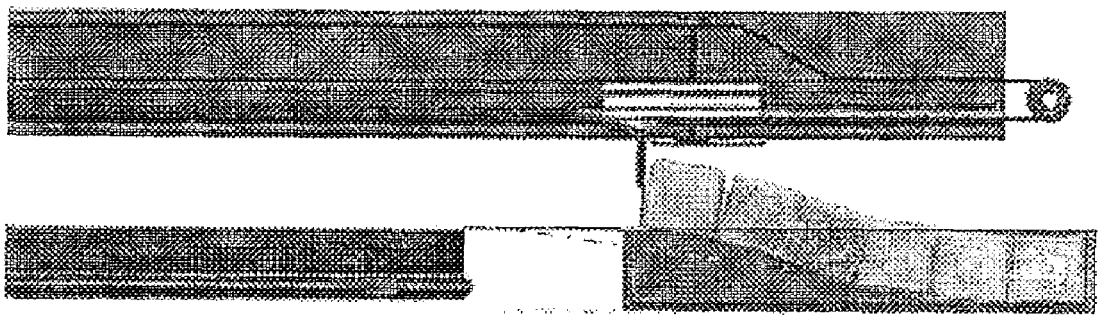
FIG. 50 is an illustration of a subsequent step in the operation of the apparatus shown in FIGS. 5-11.
Figure 51:
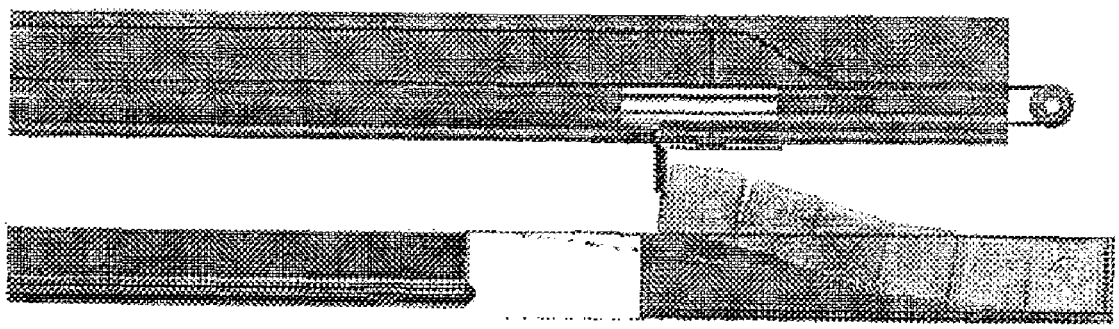
FIG. 51 is an illustration of a subsequent step in the operation of the apparatus shown in FIGS. 5-11.
Figure 52:
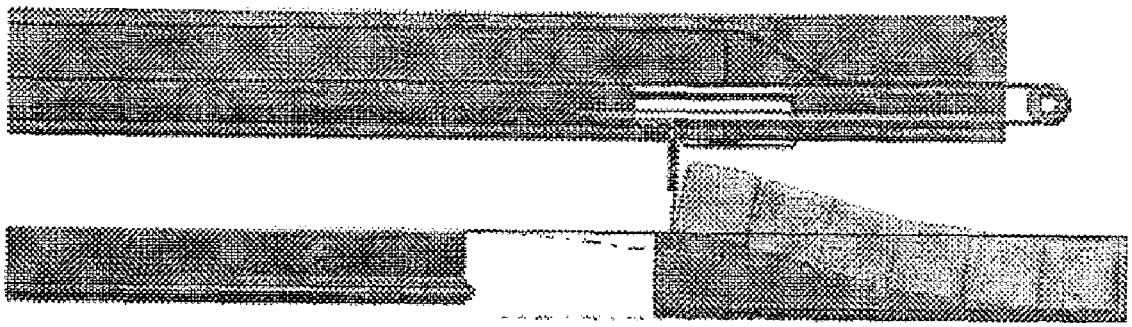
FIG. 52 is an illustration of a subsequent step in the operation of the apparatus shown in FIGS. 5-11.
Figure 53:
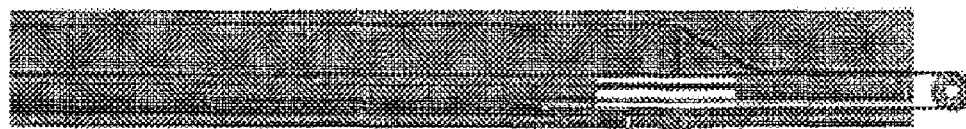
FIG. 53 is an illustration of a subsequent step in the operation of the apparatus shown in FIGS. 5-11.
Figure 54:
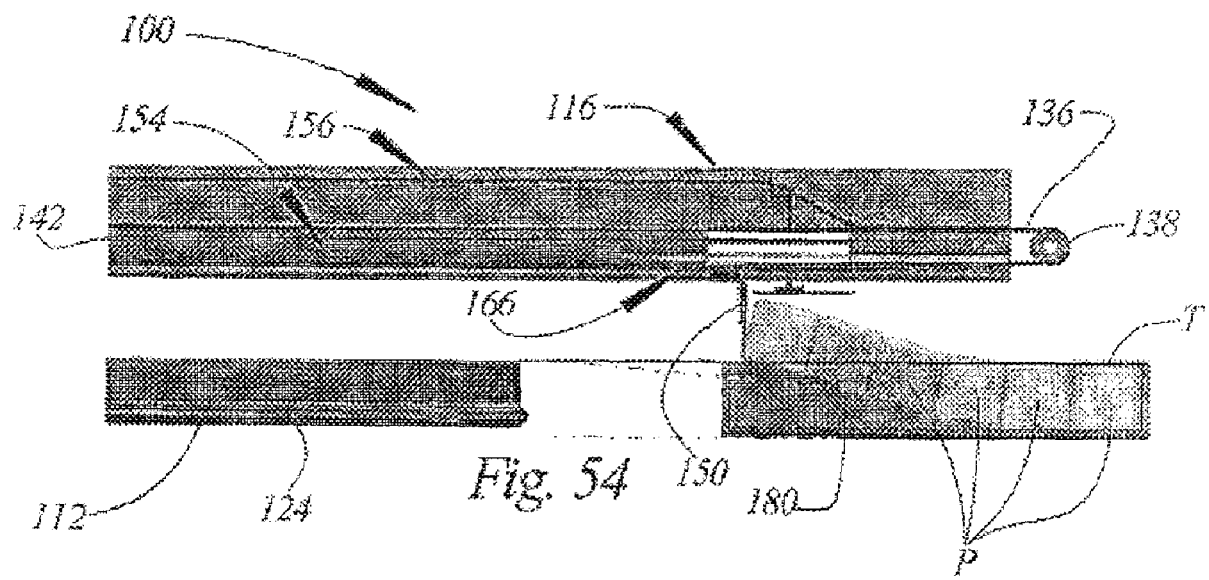
FIG. 54 is an illustration of a subsequent step in the operation of the apparatus shown in FIGS. 5-11.
Figure 55:
FIG. 55 is an illustration of a subsequent step in the operation of the apparatus shown in FIGS. 5-11.
Figure 56:
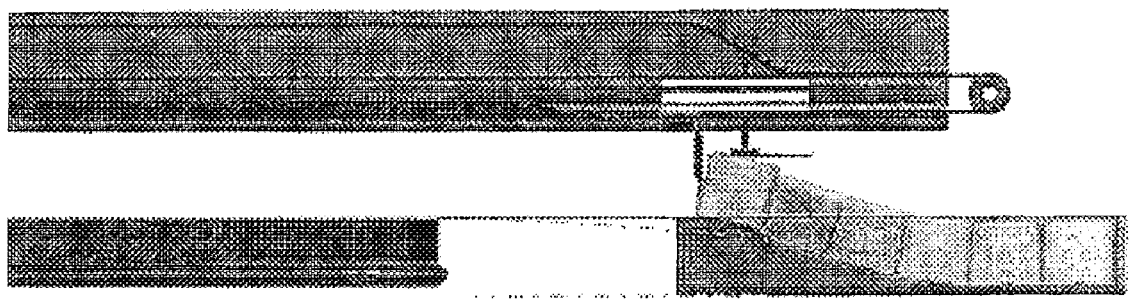
FIG. 56 is an illustration of a subsequent step in the operation of the apparatus shown in FIGS. 5-11.
Figure 57:
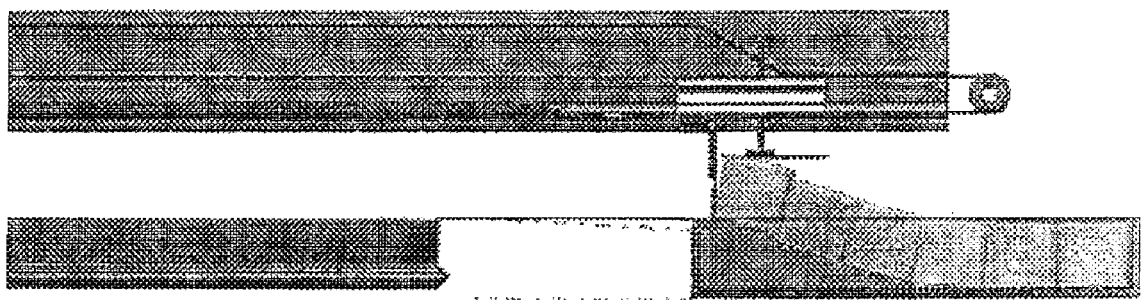
FIG. 57 is an illustration of a subsequent step in the operation of the apparatus shown in FIGS. 5-11.
Figure 58:
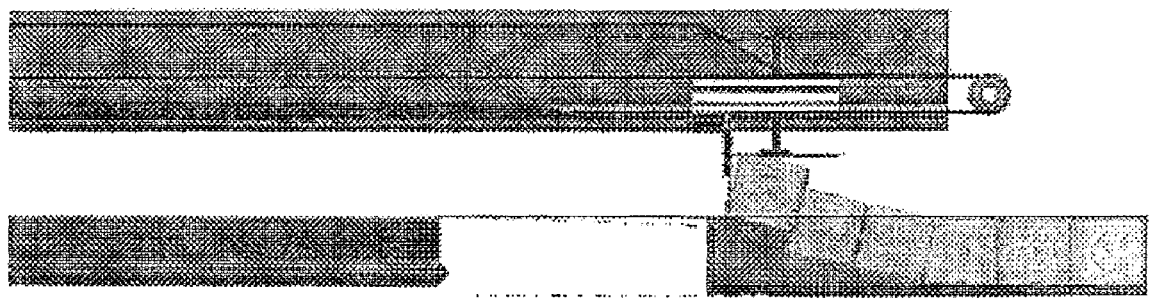
FIG. 58 is an illustration of a subsequent step in the operation of the apparatus shown in FIGS. 5-11.
Figure 59:
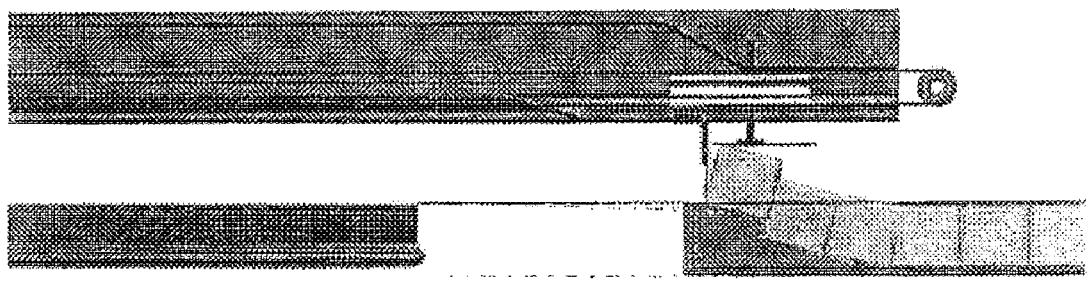
FIG. 59 is an illustration of a subsequent step in the operation of the apparatus shown in FIGS. 5-11.
Figure 60:
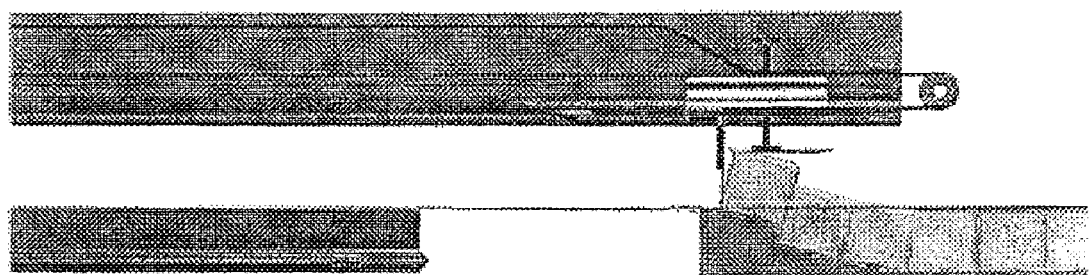
FIG. 60 is an illustration of a subsequent step in the operation of the apparatus shown in FIGS. 5-11.
Figure 61:
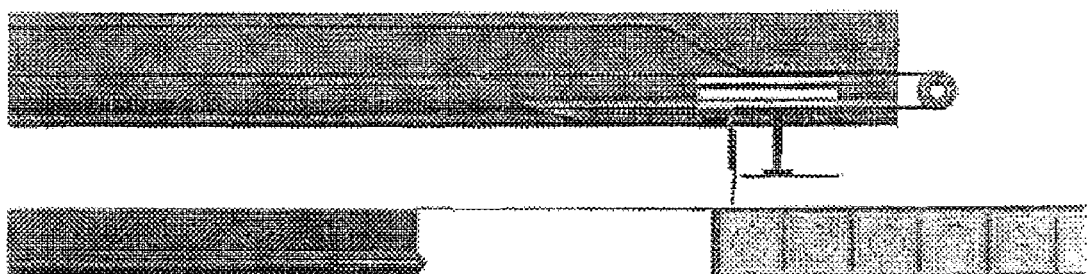
FIG. 61 is an illustration of a subsequent step in the operation of the apparatus shown in FIGS. 5-11.
Figure 62:
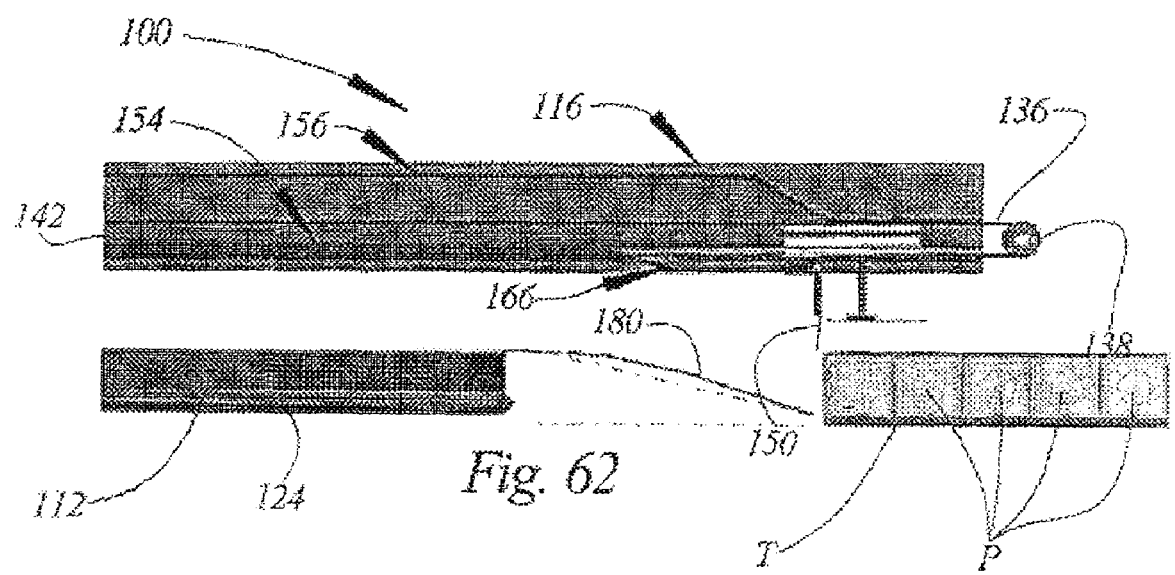
FIG. 62 is an illustration of a subsequent step in the operation of the apparatus shown in FIGS. 5-11.
Figure 63:
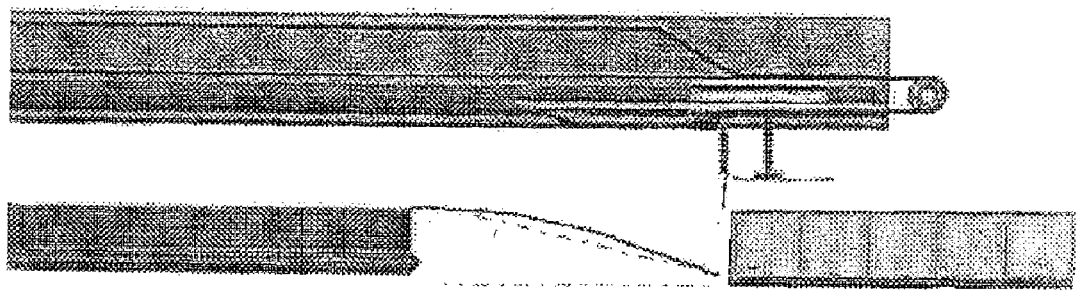
FIG. 63 is an illustration of a subsequent step in the operation of the apparatus shown in FIGS. 5-11.
Figure 66:
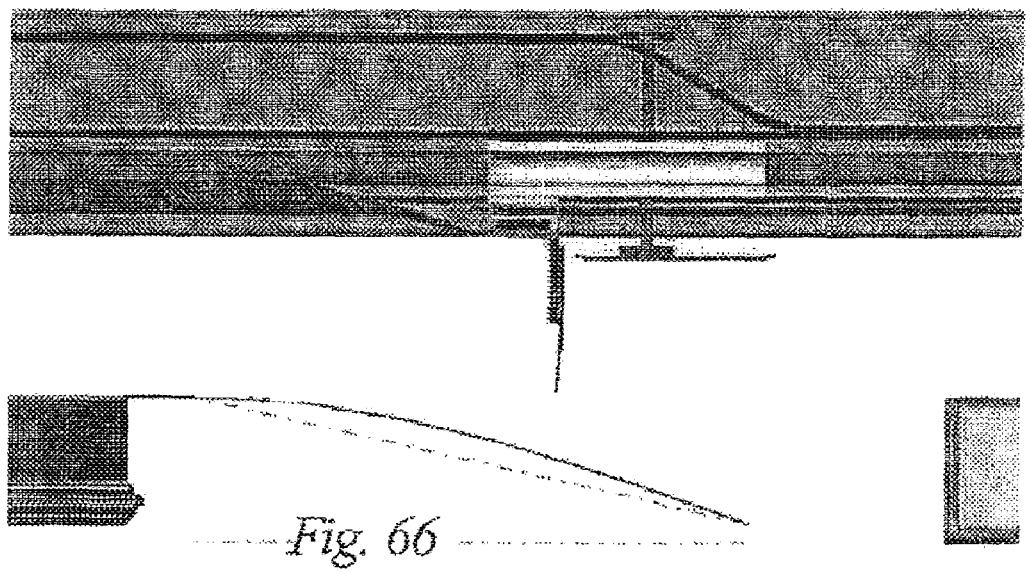
FIG. 66 is an illustration of a subsequent step in the operation of the apparatus shown in FIGS. 5-11.
Figure 67:
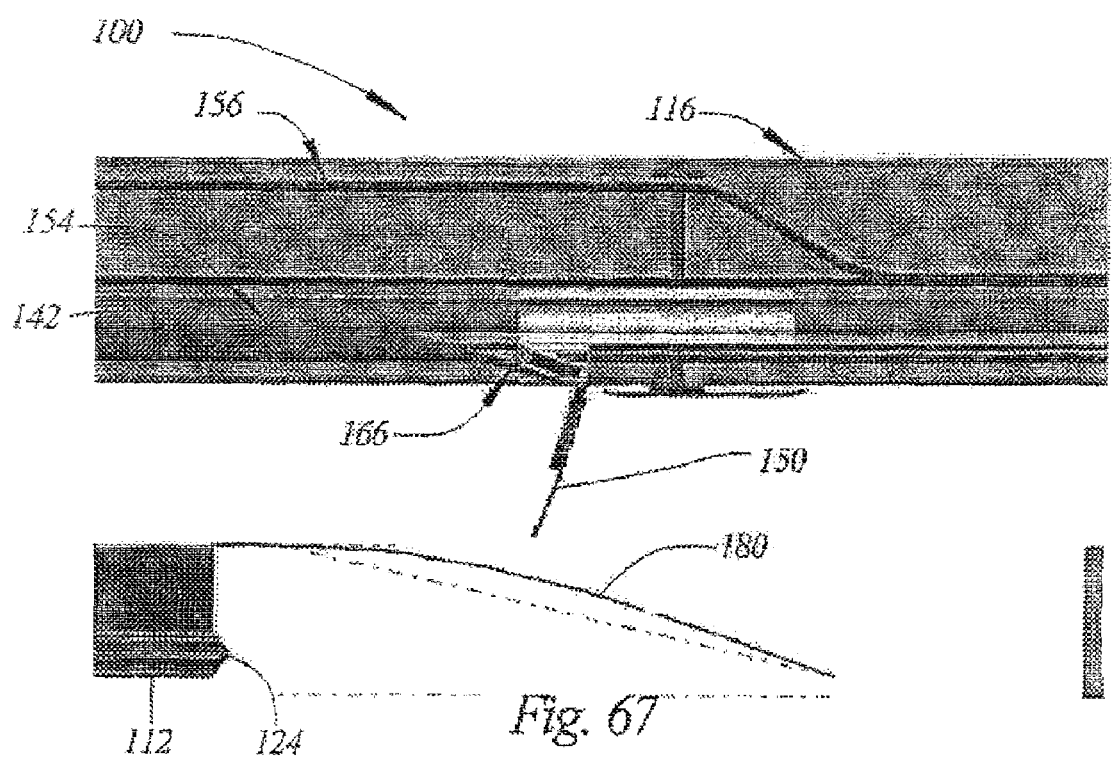
FIG. 67 is an illustration of a subsequent step in the operation of the apparatus shown in FIGS. 5-11.
Figure 68:
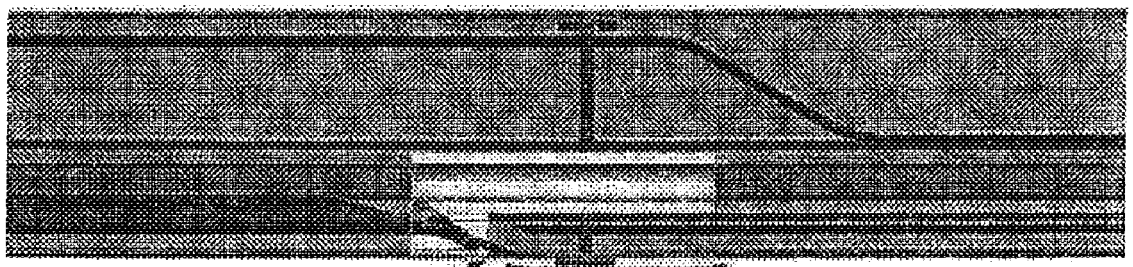
FIG. 68 is an illustration of a subsequent step in the operation of the apparatus shown in FIGS. 5-11.
Figure 69:
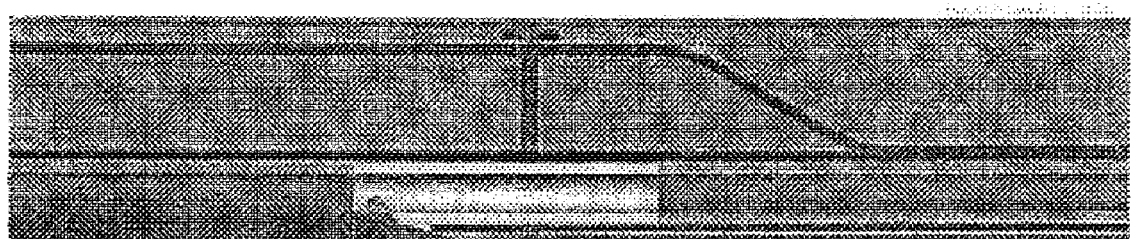
FIG. 69 is an illustration of a subsequent step in the operation of the apparatus shown in FIGS. 5-11.
Figure 72:
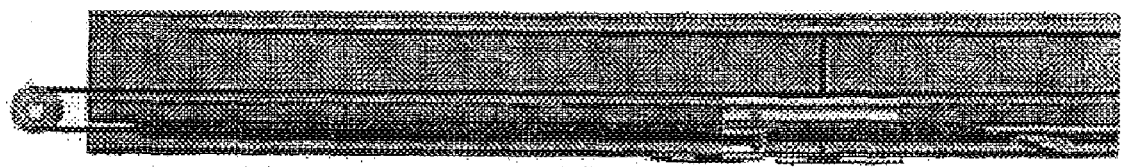
FIG. 72 is an illustration of a subsequent step in the operation of the apparatus shown in FIGS. 5-11.
Figure 73:
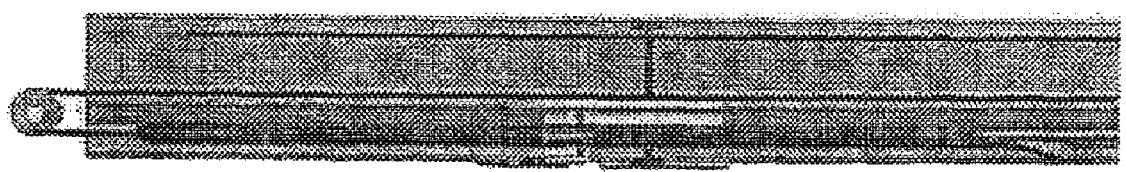
FIG. 73 is an illustration of a subsequent step in the operation of the apparatus shown in FIGS. 5-11.
Figure 74:
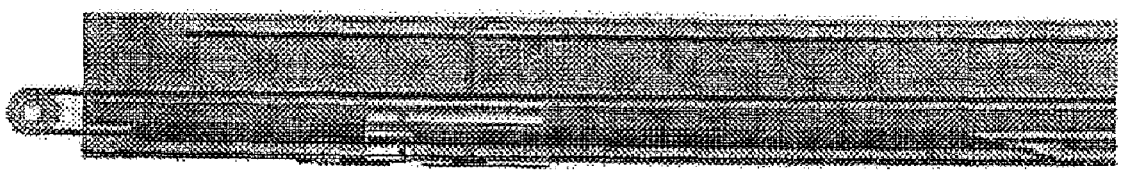
FIG. 74 is an illustration of a subsequent step in the operation of the apparatus shown in FIGS. 5-11.
Figure 77:
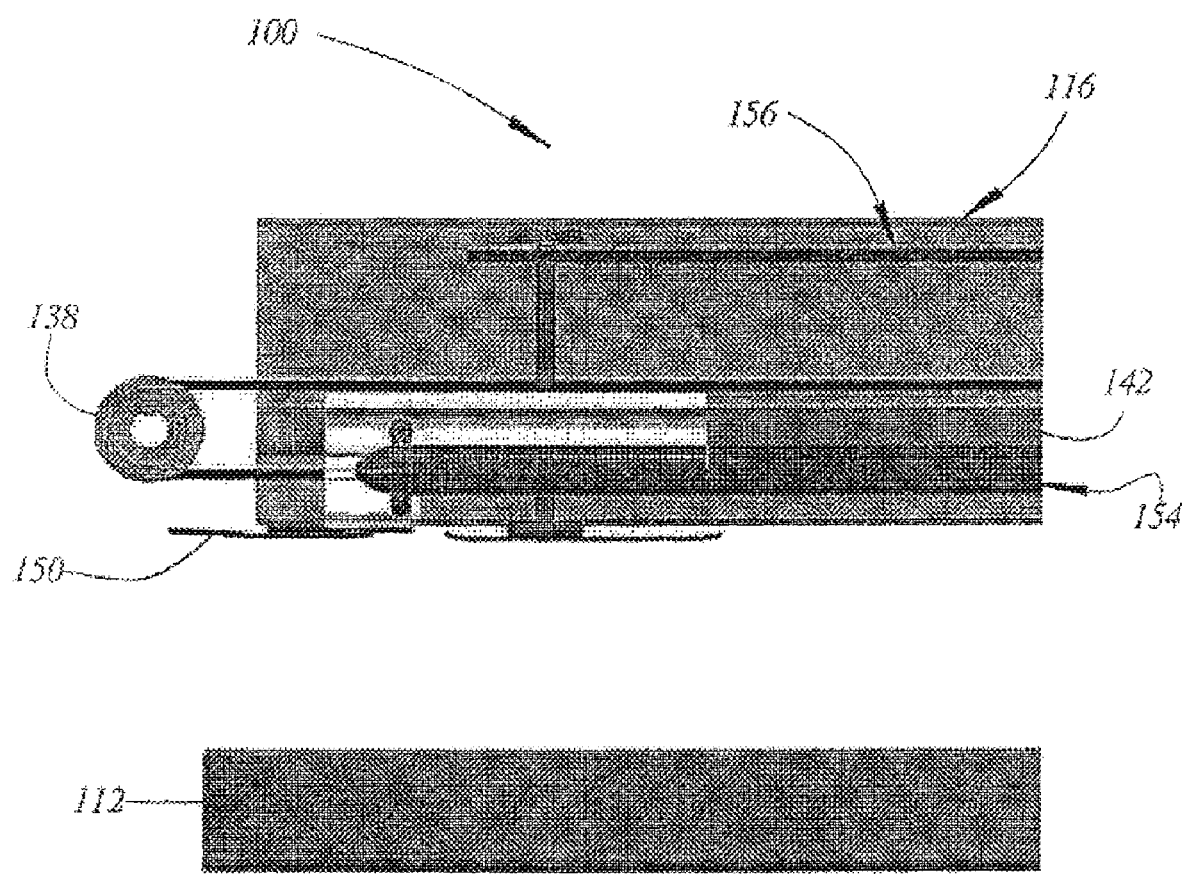
FIG. 77 is an illustration of a subsequent step in the operation of the apparatus shown in FIGS. 5-11.
Figure 78:
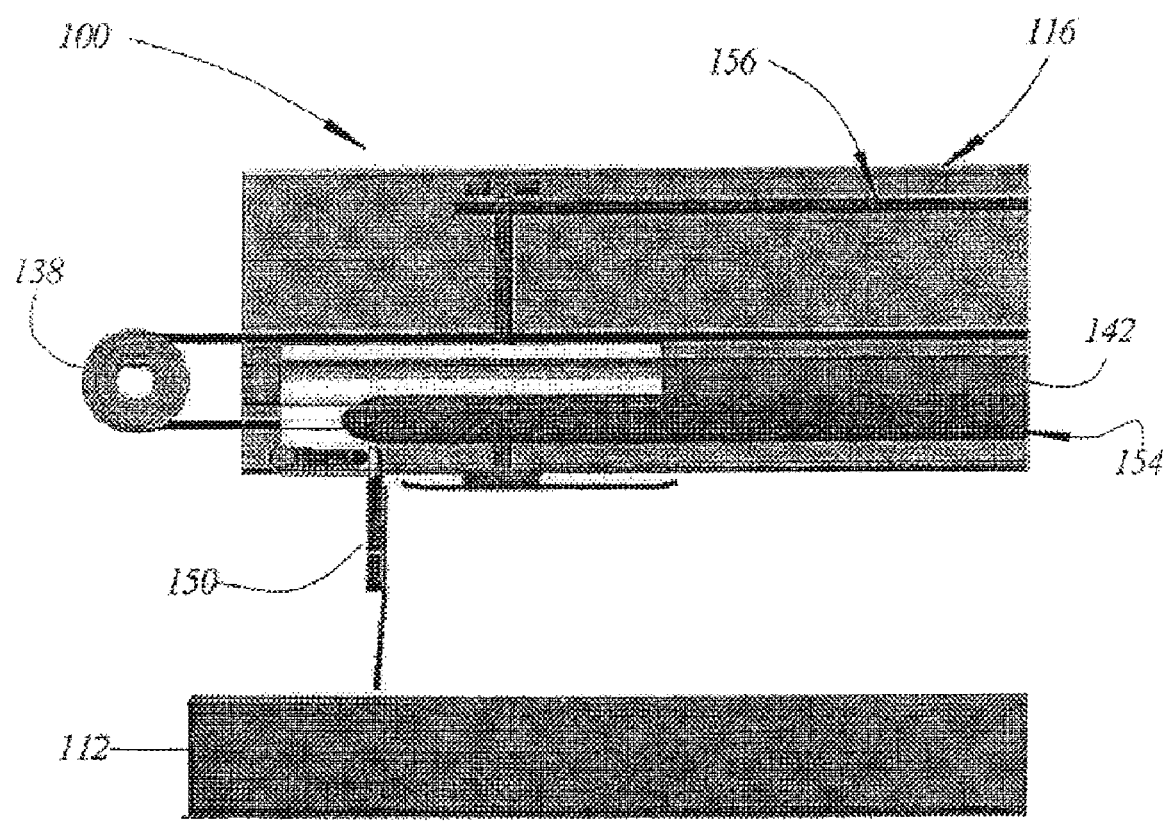
FIG. 78 is an illustration of a subsequent step in the operation of the apparatus shown in FIGS. 5-11.
Figure 79:
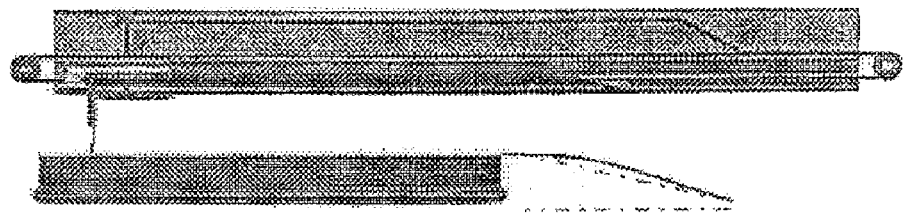
FIG. 79 is an illustration of a subsequent step in the operation of the apparatus shown in FIGS. 5-11.
Figure 80:
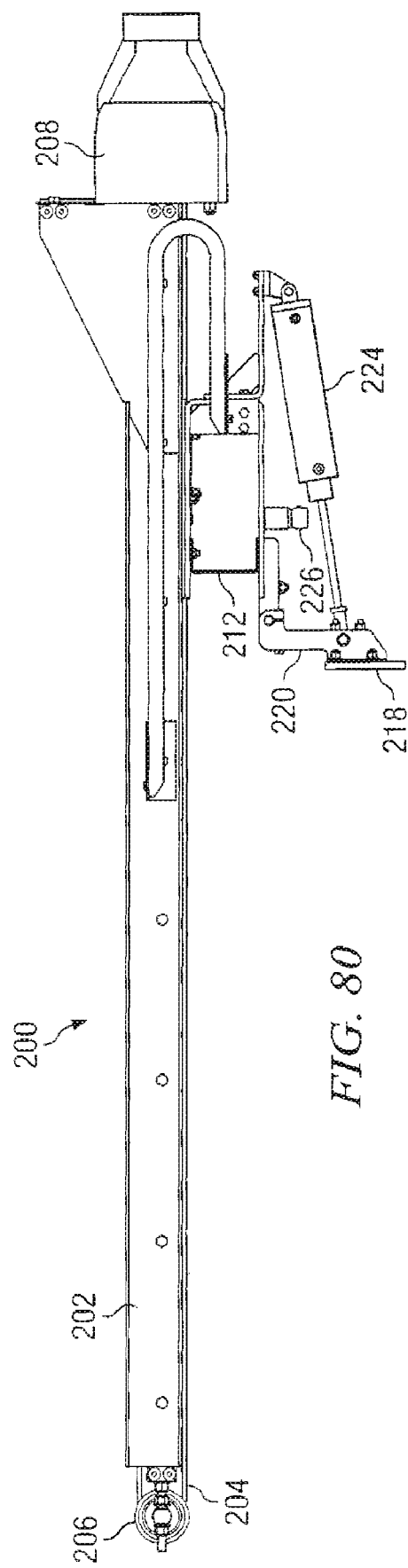
FIG. 80 is a side view of a transfer apparatus useful for moving bakery products onto the vacuum turntable of the present invention in lieu of the transfer apparatus 110 shown in FIGS. 1-3, inclusive, and described hereinabove in conjunction therewith.
Figure 81:
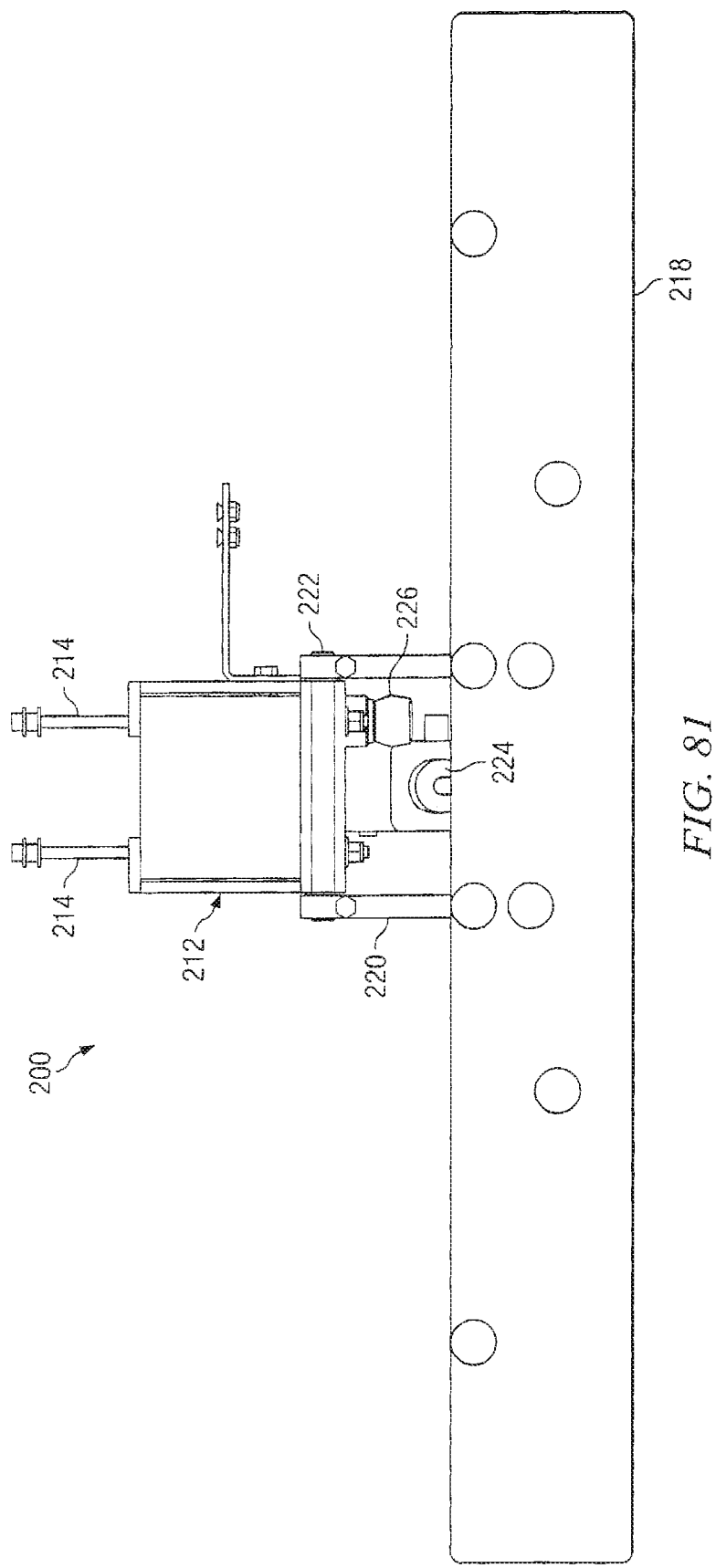
FIG. 81 is a partial end view of the transfer apparatus of FIG. 80.
Figure 82:
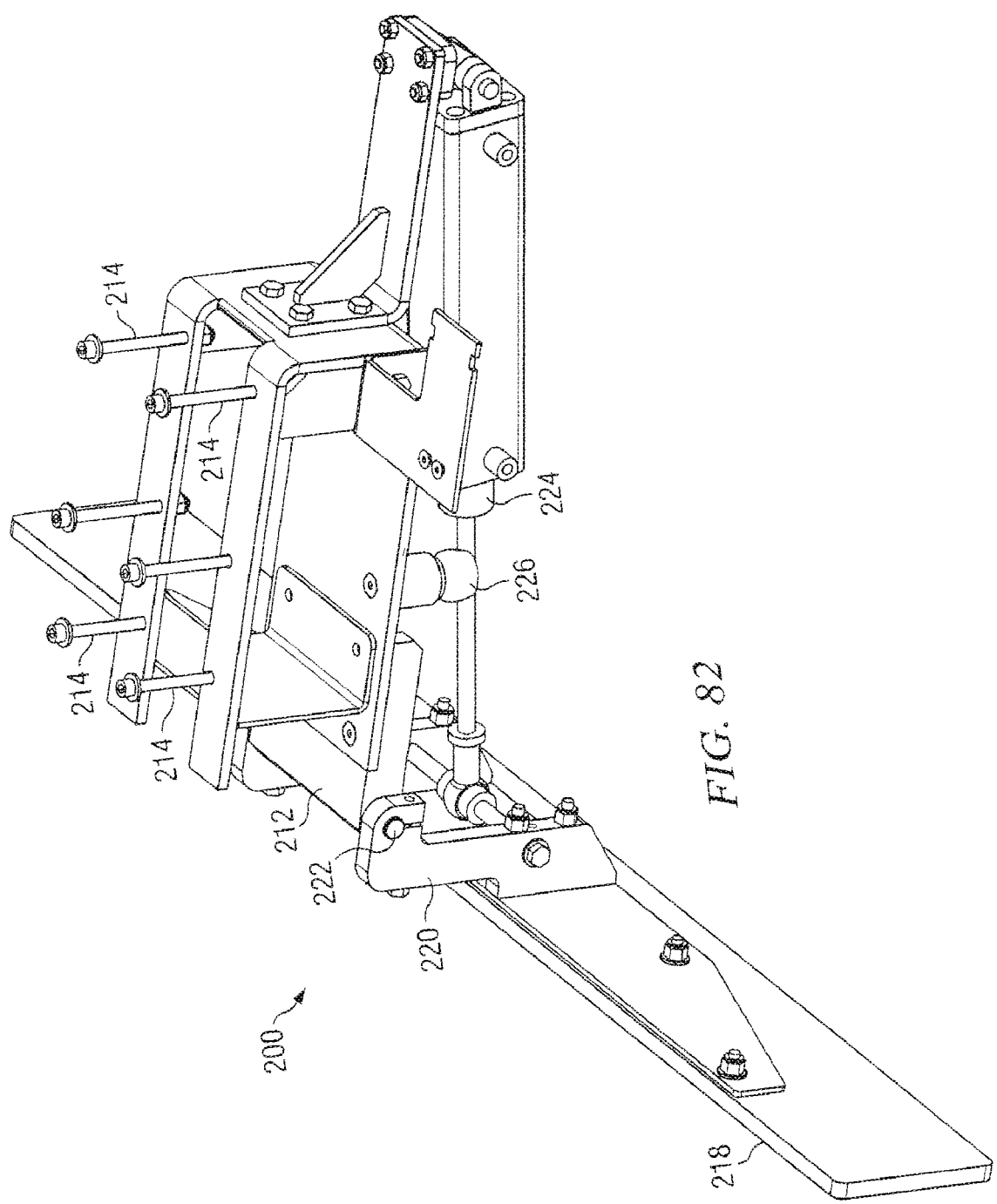
FIG. 82 is a partial rear perspective view of the transfer apparatus of FIG. 80.

The operation of the transfer apparatus 116 of the pattern former 100 is illustrated in FIGS. 12-79, inclusive. A plurality of wrapped bakery products P are positioned on the vacuum turntable 112. A bakery tray T is positioned to receive the wrapped bakery products P. A slip sheet 180 extends from the vacuum turntable 112 into the bakery tray T. The pusher plate 150 extends downwardly and engages the wrapped bakery products P. Under the action of the motor 140 operating through the drive belt 136, the pusher plate 150 begins to push the wrapped bakery products P toward the bakery tray T.

FIGS. 12-42, inclusive, depict the movement of the wrapped bakery products P away from the vacuum turntable 112 and into the bakery tray T under the action of the pusher plate 150. As will be appreciated by those skilled in the art, the wrapped bakery products P follow a sliding movement downwardly along the upper surface of the slip sheet 180 as the wrapped bakery products P enter the bakery tray T.

Referring particularly to FIGS. 43-53, the movement of the wrapped bakery products P into the bakery tray T under the action of the pusher plate 150 eventually causes the bakery tray T to move away from the vacuum turntable 112 thereby disengaging the slip sheet 180 therefrom. FIGS. 48-53 illustrate the pivotally supported section 166 of the pusher plate cams 154 pivoting upwardly to allow the cam followers 164 to pass thereunder.

FIGS. 53-63, inclusive, illustrate the final portion of the movement of the wrapped bakery products P into the bakery tray T. The cam followers 176 eventually reach the end of the flat portions of the spanker plate cams 156 whereupon the spanker plate 152 is allowed to move downwardly. As will be appreciated by those skilled in the art, the spanker plate 152 is not forced downwardly, but instead moves downwardly under the action of gravity. The function of the spanker plate 152 is to assure that the last wrapped bakery product P comprising the pattern that was formed on the vacuum turntable 112 is fully seated in the bakery tray T. Simultaneously, the slip sheet 180 is fully disengaged from the bakery tray T as the bakery tray T moves away from the vacuum turntable 112 under the action of the pusher plate 150.

FIGS. 64-79, inclusive, illustrate the return movement of the traveler 142 and the apparatus carried thereby, that is, the movement of the traveler 142 away from the motor 140 and toward the vacuum turntable 112. As the cam followers 176 move into engagement with the inclined portion of the spanker plate cams 156, the spanker plate 152 is moved upwardly. As the cam followers 164 engage the pivotally supported sections 166 of the pusher plate cams 154, the pusher plate 150 is pivoted upwardly until it extends parallel to the drive belt 136.

Upward movement of the spanker plate 152 and upward pivotal movement of the pusher plate 150 allow the pusher plate 150 and the spanker plate 152 to pass over a subsequent pattern of wrapped bakery products that was formed on the vacuum turntable 112 as the pusher plate was moving the previously formed pattern of wrapped bakery products into the bakery tray T. The fact that a pattern of wrapped bakery products can be moved into a bakery tray and a subsequent pattern of wrapped bakery products can simultaneously be formed on the vacuum turntable 112 comprises an important feature of the present invention which substantially increases the throughput rate of pattern formers incorporated in the invention.

Referring particularly to FIGS. 76-79, inclusive, when the cam followers 164 reach the ends of the upper surfaces of the pusher plate cams 154, the pusher plate 150 drops down under the action of gravity and returns to its original positioning. The spanker plate 152 remains in its raised orientation under the action of the engagement of the cam followers 176 with the spanker plate cams 156. FIG. 79 illustrates the component parts of the apparatus 116 in their original orientation and ready to move a subsequent pattern of wrapped bakery products into a bakery tray.

The transfer apparatus 110 which moves groups of wrapped bakery products from the grouping apparatus 108 to the vacuum turntable 112 operates exactly the same as the transfer apparatus 116, the only difference being that the transfer apparatus 110 does not include a spanker plate. The transfer apparatus 110 includes a pusher plate 182 which is mounted on a belt driven traveler constructed similarly to and functioning identically to the traveler 142 and which is activated by cams constructed similarly to and functioning identically to the pusher plate cams 154. Thus, the transfer apparatus 110 operates identically to the operation of the pusher plate 150 of the transfer apparatus 116 in that it is positioned in a downwardly extending, operative orientation as it moves groups of bakery products from the grouping apparatus 108 to the vacuum turntable 112, and is cammed upwardly into a horizontally disposed orientation as it moves in the reverse direction, that is, away from the vacuum turntable 112 and back toward the grouping apparatus 108. In this manner the pattern former of the present invention functions to arrange a subsequent group of wrapped bakery products on the grouping apparatus 108 as the pusher plate 182 is moving a previous group of wrapped bakery products onto the vacuum turntable 112. The fact that the two operations occur simultaneously comprises an important feature of the pattern former 100 which substantially increases the throughput rate thereof.

Figure 2:
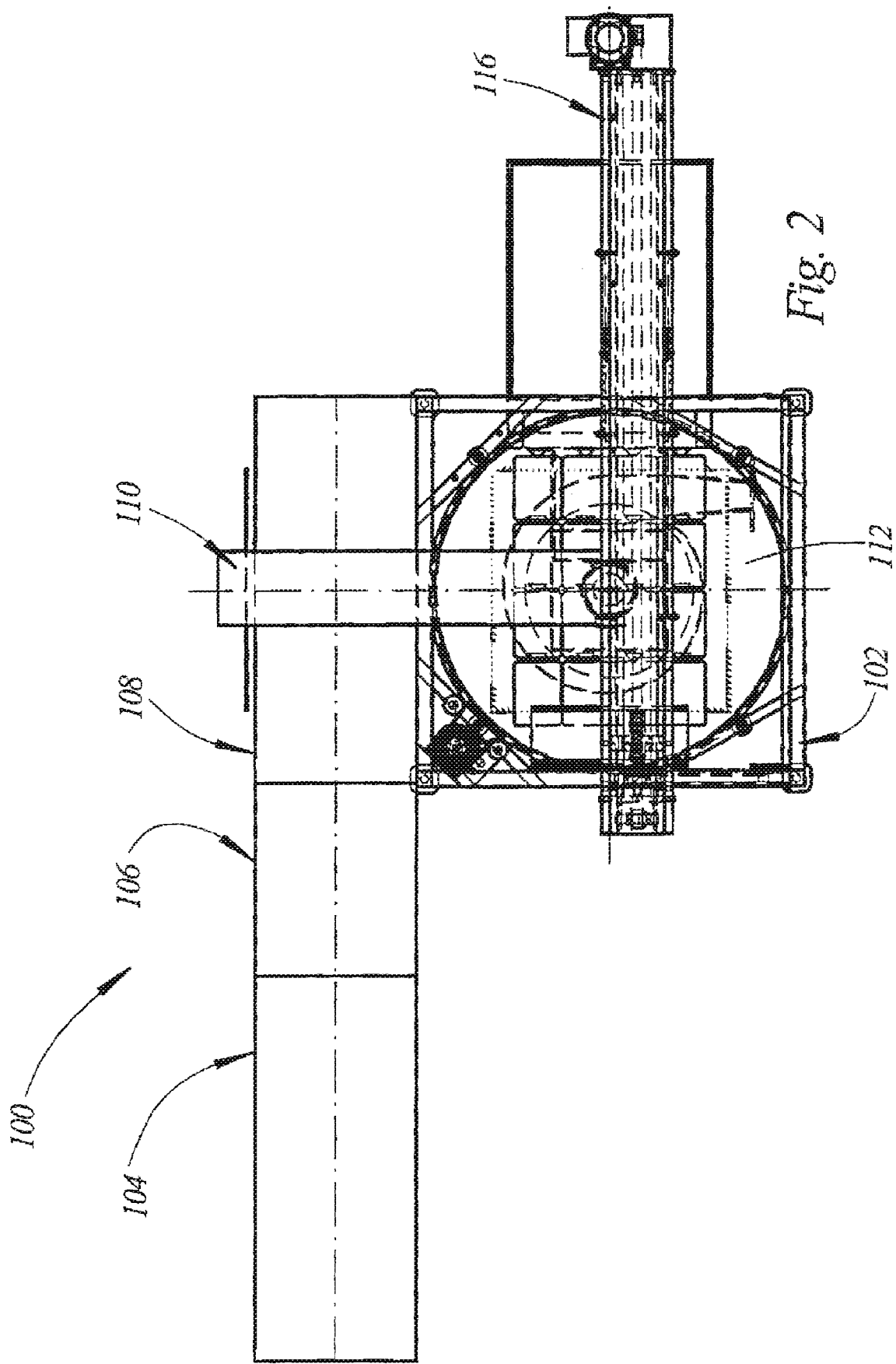
FIG. 2 is a top view of the pattern former of FIG. 1.

Referring to FIGS. 80, 81, 82, 83, and 83A, there is shown a transfer apparatus 200 which may be used in the pattern former 100 in lieu of the transfer apparatus 110 shown in FIGS. 1, 2, and 3 and described hereinabove in conjunction therewith. The transfer apparatus 200 includes a support frame 202 which defines the course of a drive cable 204. The drive cable 204 is trained around a pulley 206 mounted at one end of the support frame 202 and is actuated by a drive mechanism 208 mounted at the opposite end of the support frame 202. The transfer apparatus 200 further includes a carriage which supports a subframe 212 for movement back and forth between locations adjacent the opposite ends of the support frame 202.

Figure 83:
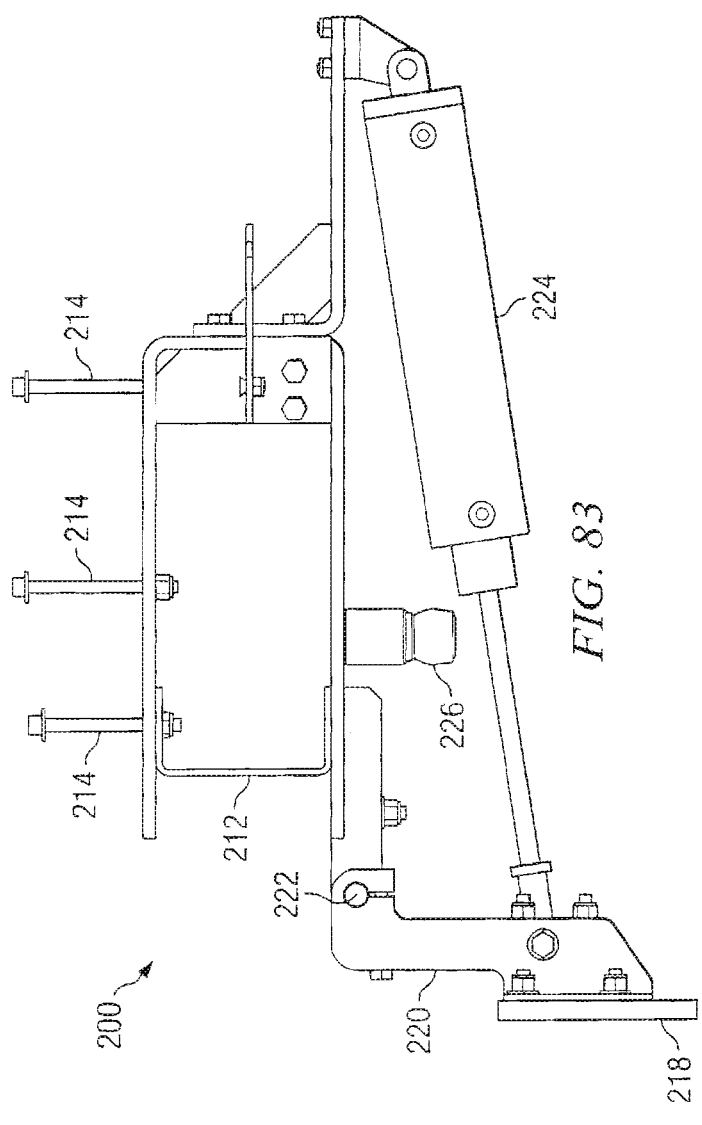
FIG. 83 is an enlargement of a portion of FIG. 80.
Figure 84:
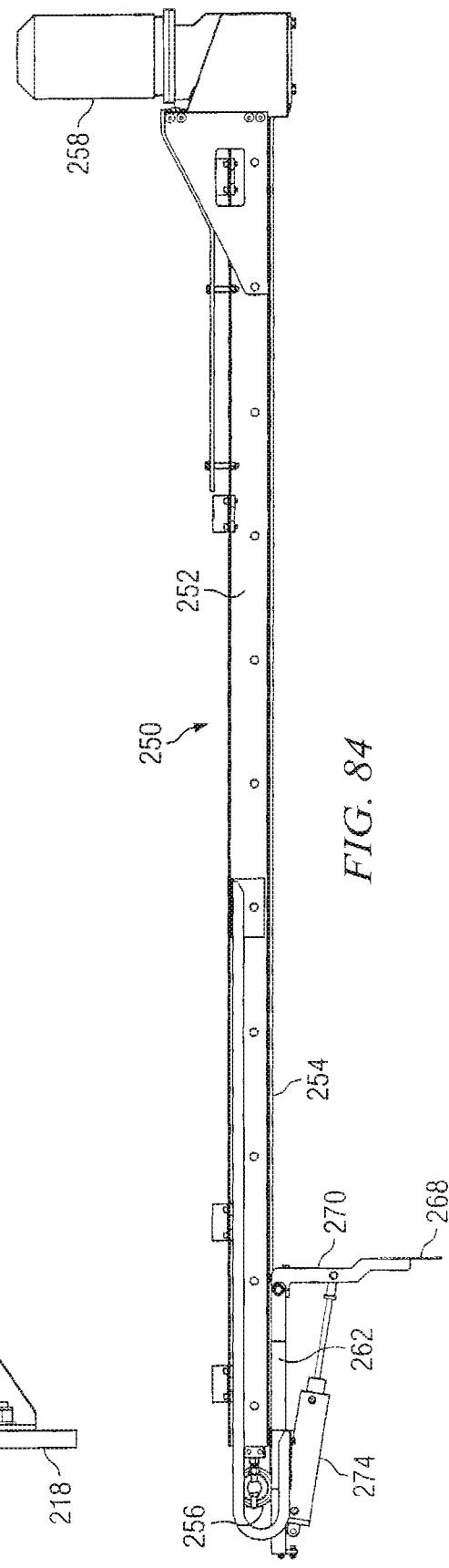
FIG. 84 is a side view of a transfer apparatus which may be used in lieu of the transfer apparatus 116 shown in FIGS. 1-79, inclusive, and described hereinabove in conjunction therewith.
Figure 83A:
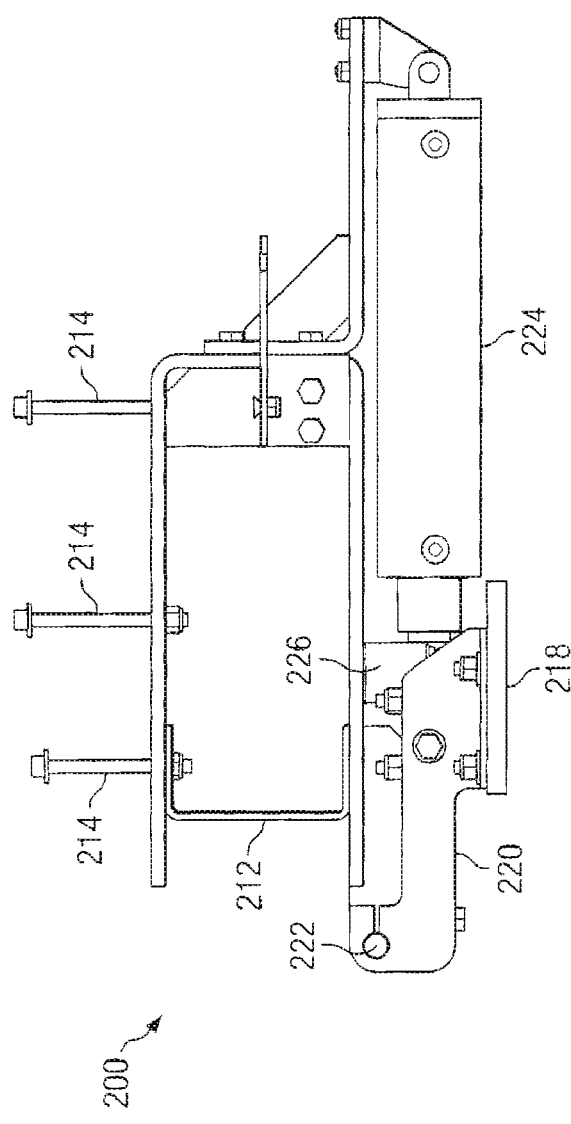
FIG. 83A is a view similar to FIG. 83 showing the apparatus thereof in a subsequent state of its operation.

Referring to FIGS. 83 and 83A, the subframe 212 is supported on the carriage of the transfer apparatus 200 by a plurality of threaded fasteners 214. A pusher plate 218 is supported by a bracket 220 which is in turn pivotedly supported on the subframe 212 by an axle 222. A fluid powered cylinder 224 is connected between the subframe 212 and the bracket 220. The function of the fluid powered cylinder 224, which may be either hydraulically or pneumatically actuated, is to pivot the pusher plate 218 between the position illustrated in FIG. 83 and the position illustrated in FIG. 83A. Pivotal movement of the pusher plate 218 away from the position illustrated in FIG. 83 and toward the position illustrated in FIG. 83A is limited by a stop 226.

Pivotal movement of the pusher plate 218 between the position illustrated in FIG. 83 and the position illustrated in FIG. 83A comprises an important feature of the invention. Thus, the pusher plate 218 is positioned as illustrated in FIG. 83 during utilization thereof to move bakery products from the grouping apparatus 108 onto the vacuum turntable 112. After the bakery products have been delivered onto the vacuum turntable 112, the fluid powered cylinder 224 is actuated to pivot the pusher plate 218 into the position illustrated in FIG. 83A. This allows the pusher plate 218 to move past a subsequent group of bakery products being formed on the grouping apparatus 108 during return movement of the subframe 212 to its original position.

Referring to FIGS. 84, 85, 85A, 86, and 87 there is shown a transfer apparatus 250 which may be utilized in the pattern former 100 in lieu of the transfer apparatus 116 as illustrated in FIGS. 1-79, inclusive, and described hereinabove in conjunction therewith. The transfer apparatus 250 includes a support frame 252. The support frame 252 defines the course of a drive belt 254 which is trained around a pulley 256 located at one end of support frame 252. The belt 254 is driven by a drive mechanism 258 mounted at the opposite end of the support frame 252.

A carriage is mounted on the support frame 252 for movement there along under the action of the belt 254. A subframe 262 is mounted on the carriage for movement thereby back and forth between positions located adjacent the opposite ends of the support frame 252.

Figure 85:
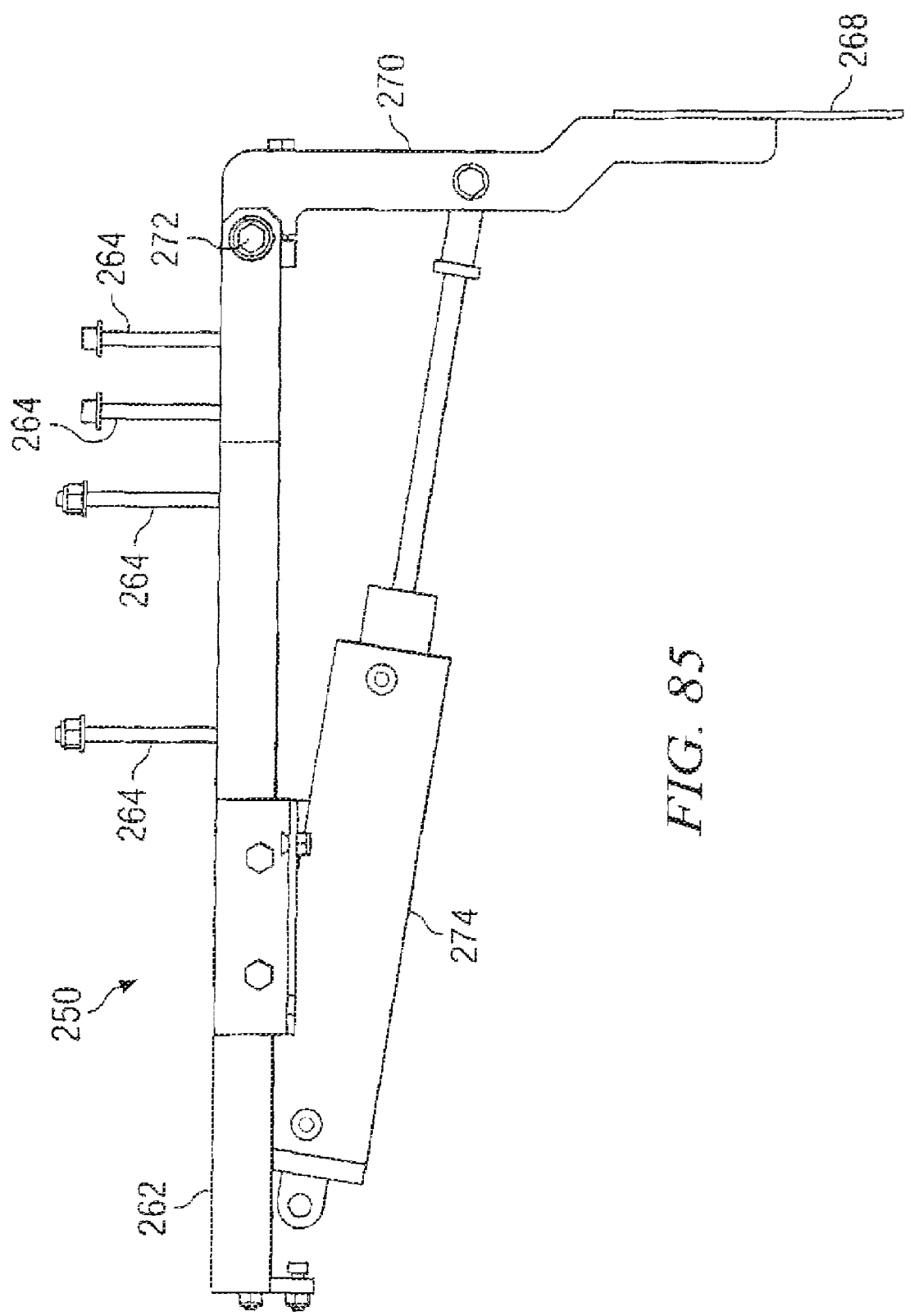
FIG. 85 is an enlargement of a portion of FIG. 84.
Figure 86:
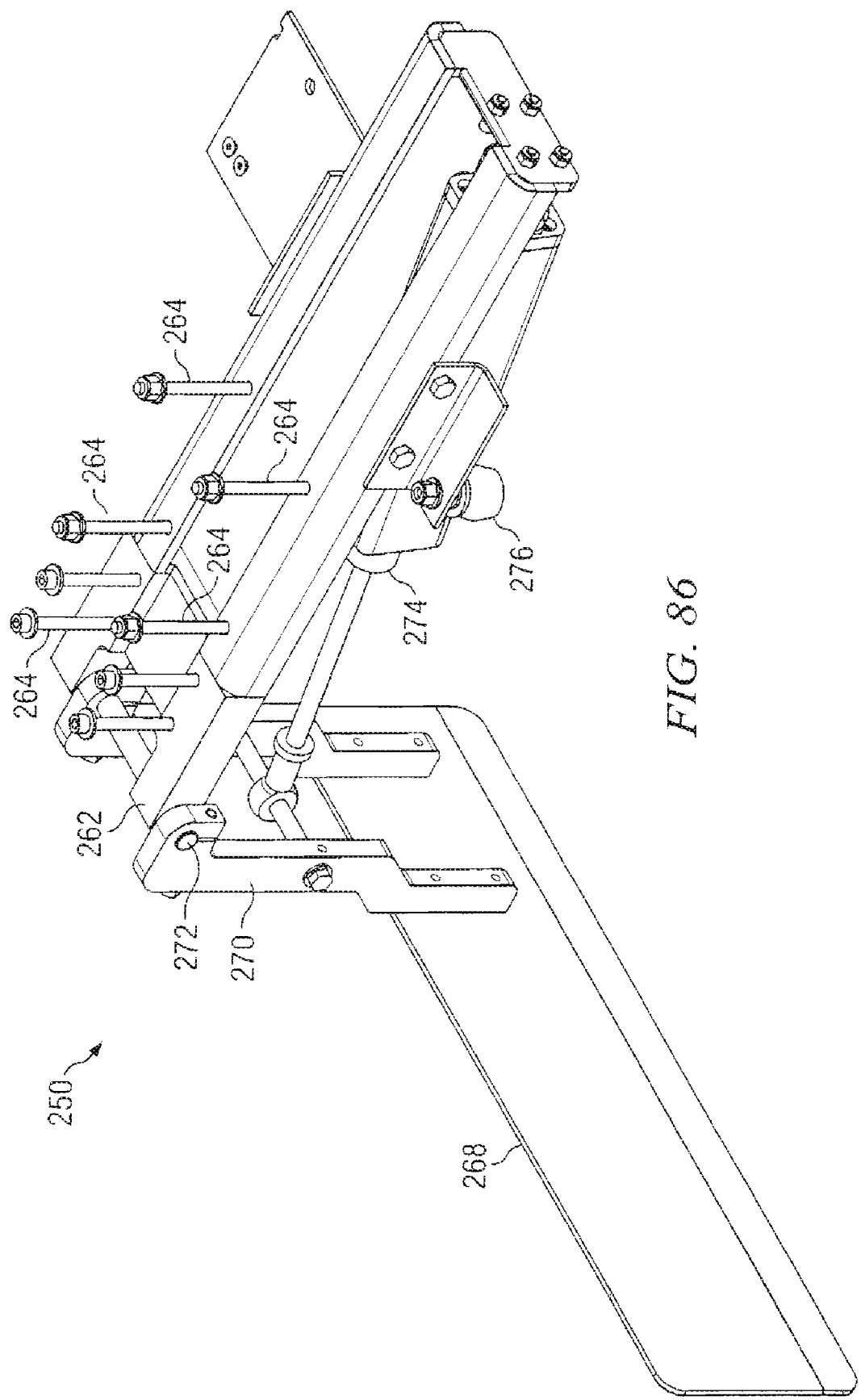
FIG. 86 is a partial rear perspective view of a portion of the apparatus of FIG. 84.
Figure 87:
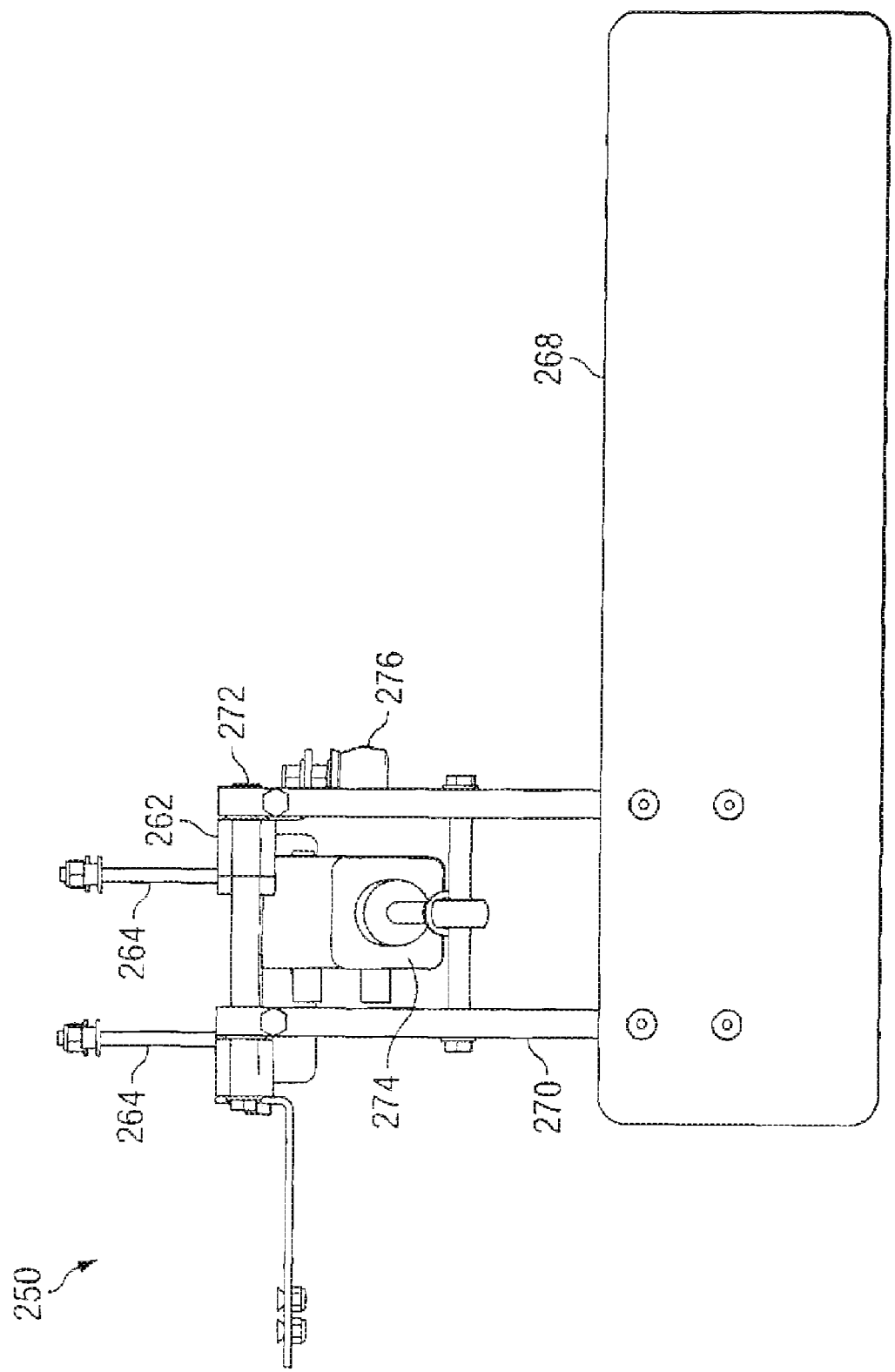
FIG. 87 is a partial end view of the transfer apparatus of FIG. 84.
Figure 85A:
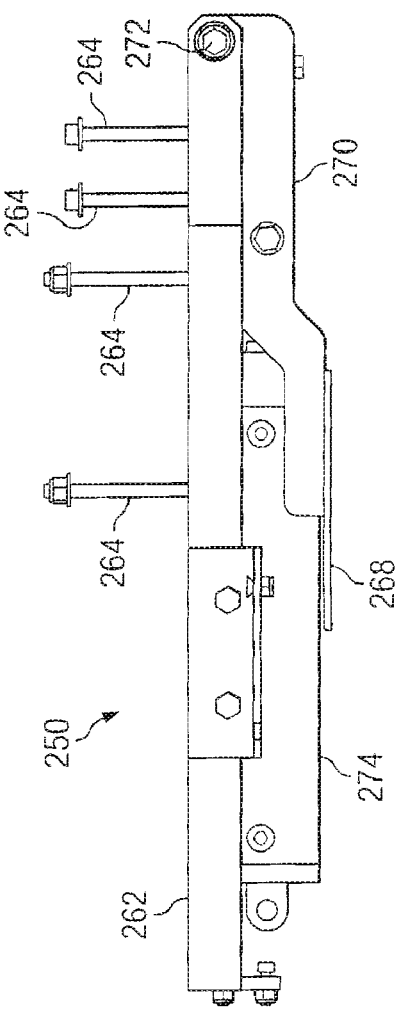
FIG. 85A is a view similar to FIG. 83 showing the apparatus thereof in a subsequent state of its operation.

Referring to FIGS. 85 and 85A, the subframe is supported on the carriage by a plurality of threaded fasteners 264. A pusher plate 268 is mounted on a bracket 270 for pivotal movement about an axis defined by an axle 272. A fluid powered cylinder 274 is supported between the subframe 262 and the bracket 270. The function of a fluid powered cylinder 274, which may be activated either hydraulically or pneumatically, is to pivot the pusher plate 268 back and forth between the position illustrated in FIG. 85 in the position illustrated in FIG. 85A. As is best shown in FIGS. 86 and 87, pivotal movement of the pusher plate 268 toward the position illustrated in FIG. 85A is limited by a stop 276.

The pivotal movement of the pusher plate 268 between the positions illustrated in FIG. 85 and the position illustrated in FIG. 85A comprises an important feature of the invention. Thus, the pusher plate 268 is positioned as illustrated in FIG. 85 to effect transfer of patterns of bakery products from the vacuum turntable 112 into bakery trays or bakery baskets. The pusher plate 268 is positioned as illustrated in FIG. 85A during return movement thereof to its original positioning. This allows a subsequent pattern of bakery products to be accumulated on the vacuum turntable 112 during the transfer of a previous pattern of bakery products into a bakery tray or a bakery basket.

Figure 88:
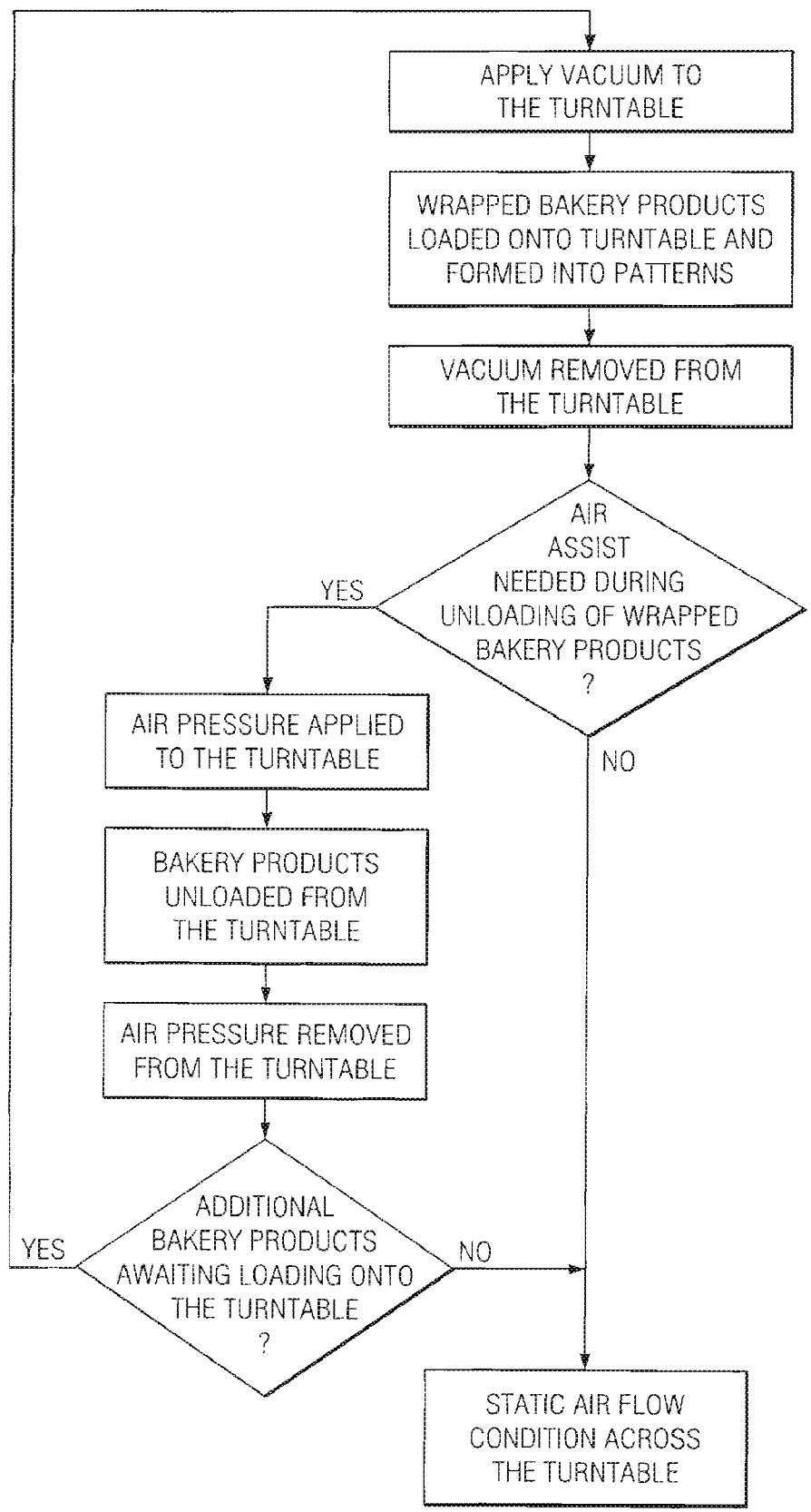
FIG. 88 is a flowchart illustrating the method for loading and unloading wrapper bakery products from the vacuum turntable of FIG. 5 comprising the method of the present invention.

The present invention further comprises a method of assembling wrapped products into a predetermined pattern and then transferring the assembled wrapped bakery products P onto a bakery tray T for delivery. FIG. 88 comprises a flowchart illustrating the method of the present invention. As illustrated in FIGS. 2 through 4 described hereinabove, as bakery products are loaded onto the vacuum turntable 112 for forming patterns thereon, vacuum is applied to the vacuum turntable 112 using the vacuum generating apparatus 118 which draws air through the perforations of the perforated plate 132 comprising the vacuum turntable 112. The vacuum is applied to the vacuum turntable 112 until the desired pattern of wrapped bakery products is formed, said process for forming the patterns of bakery products having been described herein in conjunction with FIGS. 2 through 4.

When all of the wrapped bakery products have been loaded onto the turntable and the desired pattern is formed, the air from the vacuum generating apparatus 118 is directed through the perforations of the perforated plate 132 comprising the vacuum turntable 112 creating an air assist on the upper surface thereof. The wrapped bakery products are thereafter unloaded from the vacuum turntable 112 and subsequently transferred into a bakery tray T. The air assist eliminates contact between the wrappers of the wrapped bakery products P and the upper surface of the vacuum turntable 112. By eliminating contact between the wrappers and the upper surface of the vacuum turntable 112 the wrappers do not cling or get caught on the upper surface of the vacuum turntable 112 thereby maintaining the bakery products within the wrappers in their original orientation and eliminating damage to the wrapped bakery products P. The air assist is particularly useful when the bakery products within the wrappers are buns or similar bakery products susceptible to shifting and disorientation within the wrapper.

Some bakery products do not require an air assist during unloading from the vacuum turntable 112. After the bakery products not requiring an air assist are loaded onto the turntable 112 and formed into the desired pattern vacuum is removed from the turntable and a static air condition is created across the upper surface of the turntable. The bakery products are then loaded into bakery trays as described above.

Figure 89A:
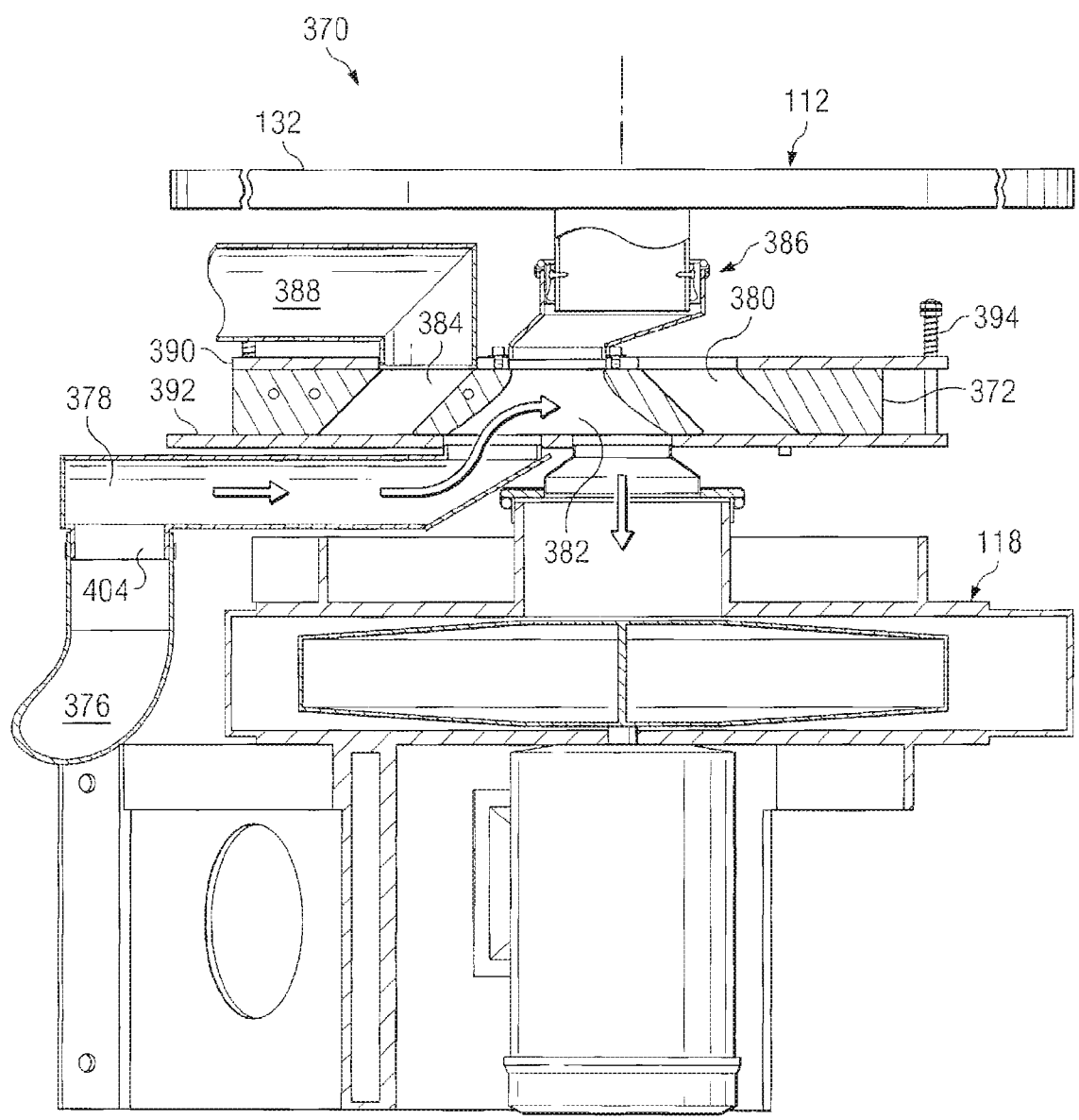
FIG. 89A is a sectional view of a valve block located beneath the vacuum turntable illustrated in FIG. 5 shown in a first position.
Figure 89B:
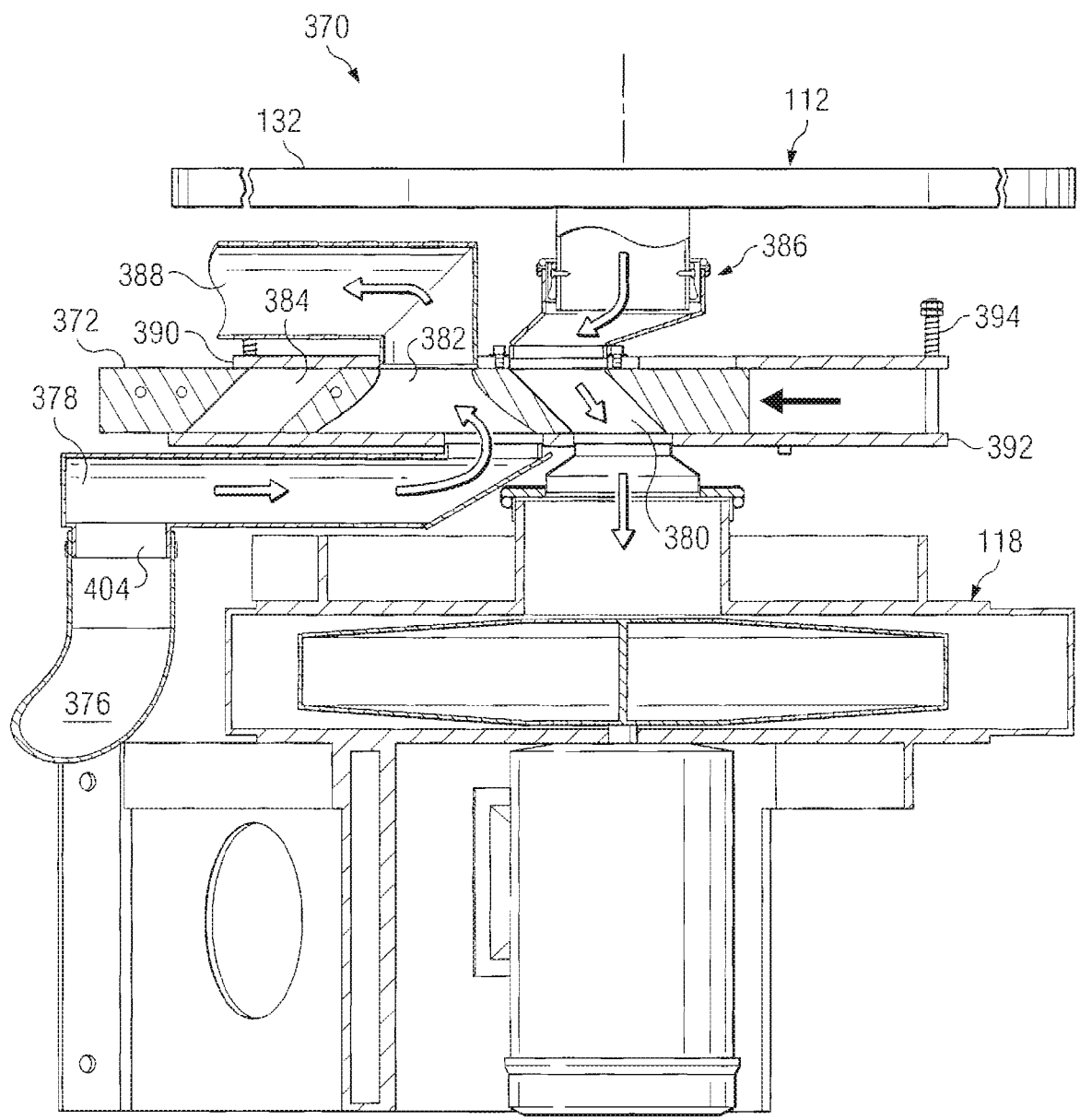
FIG. 89B illustrates the valve block shown in FIG. 88A in a second position applying vacuum to the vacuum turntable.
Figure 89C:
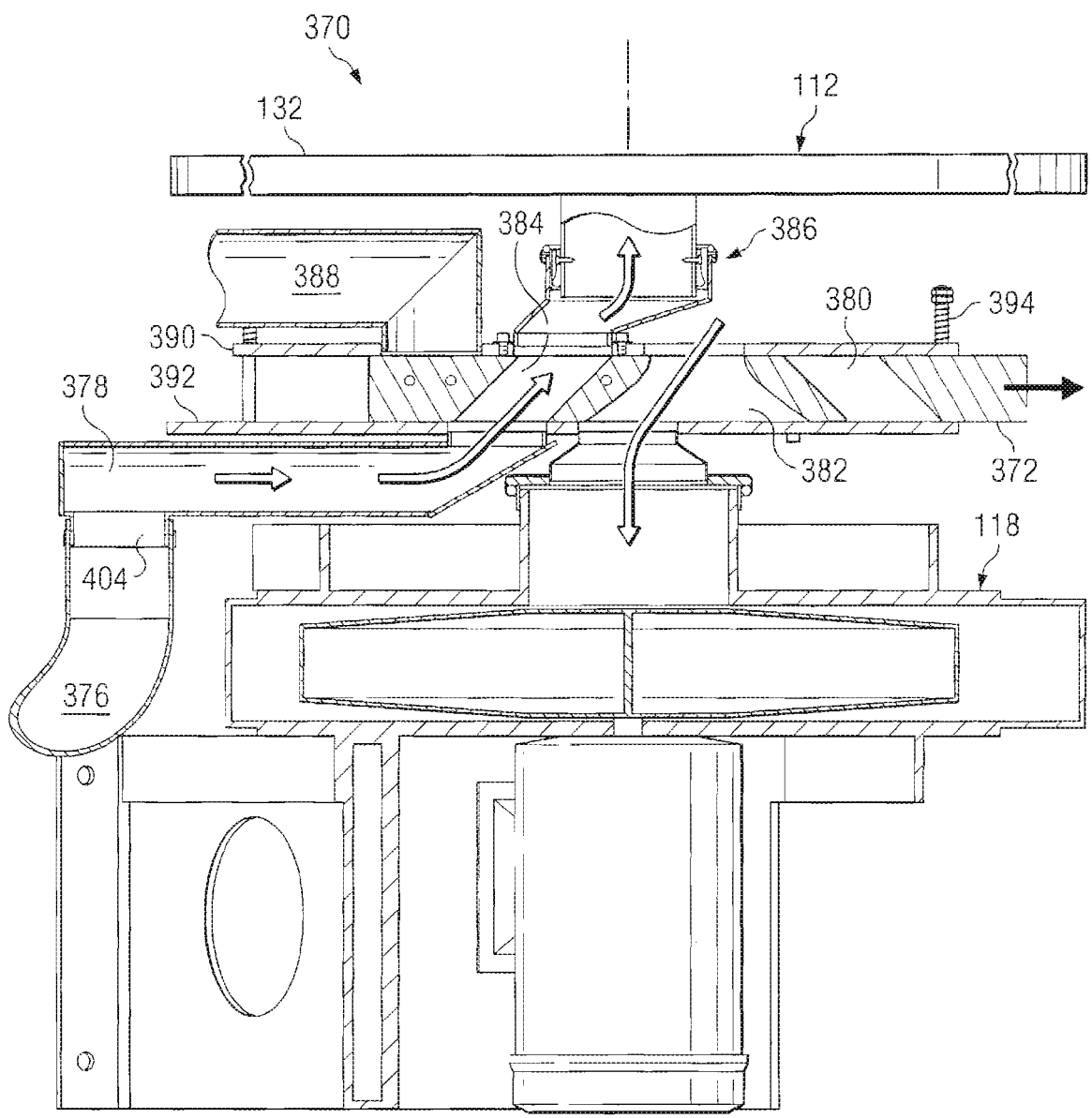
FIG. 89C illustrates the valve block shown in FIG. 88A in a third position enabling air to flow up through perforations comprising the vacuum turntable.
Figure 90:
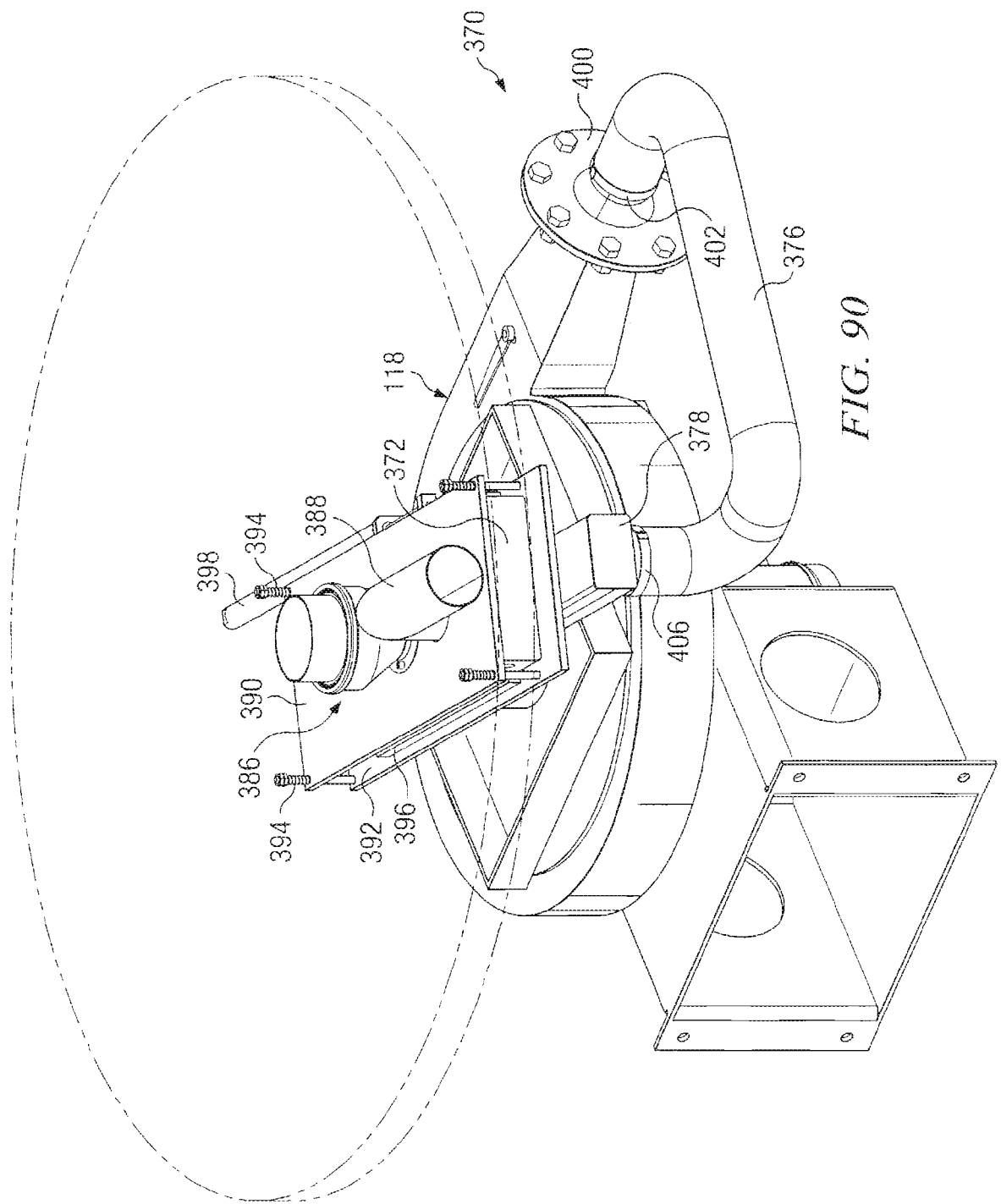
FIG. 90 is a perspective view showing air circulation to and from the valve block shown in FIG. 88A.

Referring to FIGS. 89A through 90, there is shown an air circulation system 370 for use in conjunction with the vacuum generating apparatus 118 illustrating one apparatus for carrying out the method of the present invention. The air circulation system 370 provides both vacuum to the vacuum turntable 112 and an air assist to the vacuum turntable 112. FIG. 89A illustrates a three-position valve block 372 located beneath the vacuum turntable 112 in a first position relating to a static air condition across the upper surface of the vacuum turntable 112. The air circulation system 370 further comprises a vacuum hose 376 and an intake manifold 378 for circulating air from the vacuum generating apparatus 118 back through the valve block 372. The block 372 comprises a first orifice 380, a second orifice 382, and a third orifice 384 and a manifold 386 providing airflow to and from the vacuum turntable 112. As shown in FIG. 89A, when the block 372 is positioned in a first position, the second orifice 382 aligns with the manifold 386 beneath the vacuum turntable 112, air flow beneath the vacuum turntable 112 is static, flowing into the vacuum hose 376 back to the intake manifold 378 for redirection through the vacuum generating apparatus 118. This first position is used to redirect air through the vacuum generating apparatus 118 when either no products are being loaded into the vacuum turntable 112 or when no air assist is required during transfer of patterned wrapped bakery products P from the vacuum turntable 112.

FIG. 89B illustrates the block 372 in a second position wherein vacuum is applied to the vacuum turntable 112. When the block 372 is positioned in the second position, the first orifice 380 aligns with the manifold 386 beneath the vacuum turntable 112, the vacuum generating apparatus 118 applies vacuum to the vacuum turntable 112 by pulling air through the perforations of the perforated plate 132 comprising the vacuum turntable 112 and as described hereinabove in conjunction with FIGS. 2 through 4. An exhaust weldment 388 provides exhaust means for the air pulled through vacuum generating apparatus 118. The air flows from the vacuum generating apparatus 118 through the vacuum hose 376 to the intake manifold 378 and through the second orifice 382 and out through the exhaust weldment 388. The exhaust weldment 388 may further be connected to other exhaust outlets known to those skilled in the art as required for a given production area in which the pattern former 100 is installed.

FIG. 89C illustrates the block 372 in a third position creating an air assist. The third orifice 384 aligns with the manifold 386 beneath the vacuum turntable 112. During unloading of patterned wrapped bakery products from the vacuum turntable 112 the block 372 may be shifted to the third position. Air is pulled through the second orifice into the vacuum generating apparatus 118 and thereafter flows through the vacuum hose into the intake manifold and up through the perforations of the vacuum turntable 112. The air pressure in the perforations of the perforated plate comprising the vacuum turntable 112 creates an air assist lifting the wrapped bakery products from the upper surface of the vacuum turntable 112 thereby eliminating contact between the wrapper of the patterned wrapped bakery products and the upper surface of the turntable as the bakery products are unloaded therefrom. The products are unloaded into a bakery tray T as described hereinabove in conjunction with FIGS. 12 through 79 without any shifting or movement of the bakery products within the wrappers thereby eliminating any damage to the bakery products.

Referring now to FIG. 90, there is shown a perspective view of the turntable and air circulation system 370. The block 372 is mounted between an upper plate 390 and a lower plate 392. The upper plate 390 and lower plate 392 are secured together by a plurality of threaded fasteners 394. The block moves between the first, second, and third positions along a side guide bar 396. Movement of the block 372 is actuated by an air cylinder 398 having three positions corresponding to the three positions of the block 372.

The vacuum hose 376 is coupled to the vacuum pump of the vacuum generating apparatus 118 by a flange 400 and a hose clamp 402. The vacuum hose 376 is thereafter received onto a receiving member 404 beneath the intake manifold 378 and is secured thereon by a second hose clamp 406.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. For use in conjunction with a pattern former having a perforated vacuum turntable, an air circulation system comprising:
   a three-position valve block having first, second, and third orifices therein;
   a manifold positioned between the vacuum turntable and the valve block providing airflow between the vacuum turntable and the valve block;
   means supporting the valve block for positioning in first, second, and third positions relative to the manifold;
   means for supporting the valve block beneath the vacuum turntable;
   means for selectively positioning the valve block between the first, second, and third positions;
   vacuum generating means;
   a vacuum hose connected to the vacuum generating means for receiving airflow therethrough; and
   an intake manifold for receiving airflow from the vacuum hose and directing the airflow through the valve block.

* * * * *